(12) United States Patent
Shiraishi

(10) Patent No.: US 11,402,607 B2
(45) Date of Patent: Aug. 2, 2022

(54) OBSERVATION DEVICE, OBSERVATION METHOD, AND OBSERVATION DEVICE CONTROL PROGRAM

(71) Applicant: FUJIFILM Corporation, Tokyo (JP)

(72) Inventor: Yasushi Shiraishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 339 days.

(21) Appl. No.: 16/860,878

(22) Filed: Apr. 28, 2020

(65) Prior Publication Data

US 2020/0257077 A1 Aug. 13, 2020

Related U.S. Application Data

(63) Continuation of application No. PCT/JP2018/041774, filed on Nov. 12, 2018.

(30) Foreign Application Priority Data

Nov. 17, 2017 (JP) .............................. JP2017-221444

(51) Int. Cl.
*G02B 7/28* (2021.01)
*G02B 7/09* (2021.01)
(Continued)

(52) U.S. Cl.
CPC .............. *G02B 7/282* (2013.01); *G02B 7/09* (2013.01); *G02B 21/006* (2013.01);
(Continued)

(58) Field of Classification Search
CPC ...... G01N 1/2813; G01N 15/14; G01N 33/49; G02B 25/001; G02B 21/34; A61B 5/150015; A61B 5/150358
See application file for complete search history.

(56) References Cited

U.S. PATENT DOCUMENTS

2006/0000962 A1 1/2006 Imabayashi et al.
2008/0266652 A1 10/2008 Yazdanfar et al.
(Continued)

FOREIGN PATENT DOCUMENTS

JP 10-232342 A 9/1998
JP 2003-294419 A 10/2003
(Continued)

OTHER PUBLICATIONS

International Preliminary Report on Patentability, dated May 28, 2020, and English translation of the Written Opinion of the International Searching Authority, dated Feb. 12, 2019, (Forms PCT/IB/326, PCT/IB/373, and PCT/ISA/237) for International Application No. PCT/JP2018/041774.
(Continued)

*Primary Examiner* — Robert E. Tallman
(74) *Attorney, Agent, or Firm* — Birch, Stewart, Kolasch & Birch, LLP

(57) ABSTRACT

Before an observation region of the imaging optical system reaches an observation position in a culture container, a vertical position of the culture container at the observation position is precedently detected by an auto-focus displacement sensor. In a case where an auto-focus control is performed on the basis of the position, an error between the precedently detected vertical position of the container at the observation position and a vertical position of the container at a time point when an observation region of the imaging optical system is scanned up to the observation position is acquired, and an objective lens is moved in an optical axis direction on the basis of the error.

33 Claims, 12 Drawing Sheets

(51) Int. Cl.
*G02B 21/00* (2006.01)
*G02B 21/02* (2006.01)
*G02B 21/36* (2006.01)

(52) U.S. Cl.
CPC ....... *G02B 21/008* (2013.01); *G02B 21/0036* (2013.01); *G02B 21/025* (2013.01); *G02B 21/362* (2013.01)

(56) References Cited

U.S. PATENT DOCUMENTS

| | | |
|---|---|---|
| 2014/0055851 A1 | 2/2014 | Degen et al. |
| 2017/0318216 A1 | 11/2017 | Gladnick et al. |

FOREIGN PATENT DOCUMENTS

| | | |
|---|---|---|
| JP | 2003-295065 A | 10/2003 |
| JP | 2007-218846 A | 8/2007 |
| JP | 2008-261829 A | 10/2008 |
| JP | 2010-72017 A | 4/2010 |
| WO | WO 2013/165576 A1 | 11/2013 |

OTHER PUBLICATIONS

International Search Report (Form PCT/ISA/210) for International Application No. PCT/JP2018/041774, dated Feb. 12, 2019, with English translation.
Partial Supplementary European Search Report, dated Nov. 30, 2020. for corresponding European Application No. 18877859.1.
Extended European Search Report for corresponding European Application No. 18877859.1, dated Mar. 4, 2021.

OBSERVATION DEVICE, OBSERVATION METHOD, AND OBSERVATION DEVICE CONTROL PROGRAM

CROSS-REFERENCE TO RELATED APPLICATIONS

This application is a Continuation of PCT International Application No. PCT/JP2018/041774 filed on Nov. 12, 2018, which claims priority under 35 U.S.C § 119(a) to Japanese Patent Application No. 2017-221444 filed on Nov. 17, 2017. Each of the above application(s) is hereby expressly incorporated by reference, in its entirety, into the present application.

BACKGROUND OF THE INVENTION

1. Field of the Invention

The present invention relates to an observation device, an observation method, and an observation device control program for observing an entire image of an observation target by relatively moving a container in which the observation target is contained with respect to an imaging optical system that forms an image of the observation target.

2. Description of the Related Art

In the related art, a method for capturing an image of a multipotential stem cell such as an embryonic stem (ES) cell or an induced pluripotent stem (iPS) cell, a differentiated and induced cell, or the like using a microscope or the like, and capturing a feature of the image to decide a differentiation state of the cell, or the like has been proposed.

The multipotential stem cell such as an ES cell or an iPS cell is able to be differentiated into cells of various tissues, and may be applied to regenerative medicine, development of medicines, explanation of diseases, or the like.

On the other hand, in a case where a cell is imaged using a microscope as described above, in order to acquire a high-magnification wide view image, for example, a so-called tiling imaging technique for scanning the inside of a range of a culture container such as a well plate using an imaging optical system and capturing an image for each observation position, and then, combining the images at the respective observation positions has been proposed.

SUMMARY OF THE INVENTION

Here, in a case where the image for each observation position is captured as described above, there are many cases where a focal position of the imaging optical system is adjusted on a bottom surface of the culture container. However, the thickness of a bottom portion of the culture container has a millimeter-order fabrication tolerance, and thus, in a case where high-magnification imaging is performed, it is necessary to adjust the focal position for each observation position. On the other hand, it is desirable that a cell imaging time is short, and thus, it is desirable to provide a device capable of performing high-speed imaging.

However, in a related-art auto-focus control method, about 2 seconds are necessary for each observation position, and for example, in a case where the number of observation positions is 300, it takes 10 minutes only for a time necessary for an auto-focus control, which makes it impossible to perform high-speed imaging.

JP2010-072017A discloses a method for precedently detecting, before an observation region of an imaging optical system reaches an observation position, a position of a well plate using a displacement gauge and moving an objective lens in an optical axis direction to perform an auto-focus control before the observation region reaches the observation position, in order to shorten an imaging time.

However, as disclosed in JP2010-072017A, in a case where an image of an observation target in the well plate installed on an XY stage is observed while moving the XY stage, a Z-directional position of the XY stage is not constant, and the Z-directional position is changed according to the position of the XY stage, due to mechanical accuracy of a mechanism that moves the XY stage. That is, a so-called "undulation" occurs in the movement of the XY stage.

Accordingly, as disclosed in JP2010-072017A, in a case where the Z-directional position of the well plate is precedently detected and the movement of the objective lens in the optical axis direction is to be controlled on the basis of the detected position, since the positions of the displacement meter and the objective lens in an X-directional position are different from each other, a detection timing of the displacement meter in the Z-directional position and an observation timing of the objective lens are different from each other, with respect to a predetermined position of the well plate.

Accordingly, in a case where the Z-directional position of the XY stage at a time point when the Z-directional position of the well plate is detected by the displacement meter and the Z-directional position of the XY stage at a time point when the detected position in the displacement meter is thereafter moved to the position of the objective lens are different from each other, an error occurs at the Z-directional position of the well plate due to an error of the Z-directional position of the XY stage. Thus, it is not possible to perform an appropriate auto-focus control, which results in an out-of-focus image.

In consideration of the above-mentioned problems, an object of the present invention is to provide an observation device, an observation method, and an observation device control program capable of performing an auto-focus control with high accuracy, without being affected by a vertical position change based on movement of a container such as a vessel.

According to an aspect of the present invention, there is provided an observation device including: an imaging optical system having an imaging lens that forms an image of an observation target in a container in which the observation target is contained; an imaging system having an imaging element that captures the image of the observation target formed by the imaging optical system; an operation section that performs at least one of a first operation of changing a focal length of the imaging optical system, a second operation of moving the imaging lens in an optical axis direction, a third operation of moving the imaging element in the optical axis direction, or a fourth operation of moving the container in the optical axis direction; a horizontal driving section that moves at least one of the container or the imaging optical system in a horizontal plane; a scanning controller that controls the horizontal driving section to move at least one of the container or the imaging optical system in the horizontal plane, to scan each observation position in the container in an observation region of the imaging optical system; a detection section having an auto-focus displacement sensor that precedently detects a vertical position of the container at the observation position before the observation region reaches the observation position in the container, through the scan in the observation region of the imaging optical system; an operation controller that controls the operation section on the basis of the vertical position of the container detected by the detection section; and a vertical direction error acquisition section that acquires an error between a vertical position of the container at a time point when the vertical position of the container is precedently detected at the observation position by the auto-focus displacement sensor and a vertical position of the container at a time point when the observation region of the imaging optical system is scanned up to the observation position, in which when the observation position is scanned by the observation region of the imaging optical system, the operation controller controls the operation section on the basis of the vertical position of the container at the observation position that is precedently detected by the auto-focus displacement sensor and the error acquired by the vertical direction error acquisition section.

The "vertical direction error acquisition section" acquires the error in the vertical direction of the container, and the container is moved by the stage or the like. For this reason, the error of the stage in the vertical direction or the like substantially coincides with the error of the container in the vertical direction. Accordingly, in the present invention, the acquisition of the error of the container in the vertical direction and the acquisition of the error of the stage in the vertical direction mean acquisition of substantially the same error.

According to the above aspect of the invention, in the observation device, the operation section may perform a plurality of operations among the first operation, the second operation, the third operation, and the fourth operation.

According to another aspect of the present invention, there is provided an observation device including: an imaging optical system having an imaging lens that forms an image of an observation target in a container in which the observation target is contained; an operation section that performs at least one of a first operation of changing a focal length of the imaging optical system, a second operation of moving the imaging lens in an optical axis direction, or a fourth operation of moving the container in the optical axis direction; a horizontal driving section that moves at least one of the container or the imaging optical system in a horizontal plane; a scanning controller that controls the horizontal driving section to move at least one of the container or the imaging optical system in the horizontal plane, to scan each observation position in the container in an observation region of the imaging optical system; a detection section having an auto-focus displacement sensor that precedently detects a vertical position of the container at the observation position before the observation region reaches the observation position in the container, through the scan in the observation region of the imaging optical system; an operation controller that controls the operation section on the basis of the vertical position of the container detected by the detection section; and a vertical direction error acquisition section that acquires an error between a vertical position of the container at a time point when the vertical position of the container is precedently detected at the observation position by the auto-focus displacement sensor and a vertical position of the container at a time point when the observation region of the imaging optical system is scanned up to the observation position, in which when the observation position is scanned by the observation region of the imaging optical system, the operation controller controls the operation section on the basis of the vertical position of the container at the observation position that is precedently detected by the auto-focus displacement sensor and the error acquired by the vertical direction error acquisition section.

According to the above aspect of the present invention, the operation section may perform a plurality of operations among the first operation, the second operation, and the fourth operation.

In the above aspects of the present invention, in the observation device, the imaging optical system may further include an objective lens that forms the image of the observation target in the container, and the first operation may include at least one of an operation of changing a focal length of the imaging lens or an operation of changing a focal length of the objective lens.

Further, according to the above aspects of the present invention, the observation device may further include a focal length changing optical system for changing a focal length of the imaging optical system, in which the imaging optical system may further include an objective lens that forms an image of the observation target in the container, and the first operation may include at least one of an operation of changing the focal length of the imaging lens, an operation of changing the focal length of the objective lens, or an operation of changing the focal length of the imaging optical system by the focal length changing optical system.

According to the above aspects of the present invention, the operation section may perform a fifth operation of moving the objective lens in the optical axis direction.

Further, according to the above aspects of the present invention, the observation device may further include a focal length changing optical system for changing a focal length of the imaging optical system, in which the first operation may include an operation of changing the focal length of the imaging optical system by the focal length changing optical system.

In the above aspects of the present invention, in the observation device, the imaging optical system may further include an objective lens that forms the image of the observation target in the container, and in which the operation section may perform a fifth operation of moving the objective lens in the optical axis direction.

According to the above aspects of the present invention, in the observation device, the horizontal driving section may move the container in a sub-scanning direction orthogonal to a main scanning direction while reciprocating the container in the main scanning direction with respect to the imaging optical system, and the vertical direction error acquisition section may acquire different errors between a case where the container is moved forward with respect to the imaging optical system and a case where the container is moved backward with respect to the imaging optical system.

According to the above aspects of the present invention, the detection section may include at least two auto-focus displacement sensors that are provided in parallel in the main scanning direction with the imaging optical system being interposed therebetween, and the vertical direction error acquisition section may acquire the vertical position of the container at the scanning position of the observation region of the imaging optical system, on the basis of the vertical position of the container detected by the two auto-focus displacement sensors.

Further, according to the above aspects of the present invention, the observation device may include: two first position measurement displacement sensors that are provided in parallel in the sub-scanning direction at the same positions as the positions of the auto-focus displacement sensors in the main scanning direction with the auto-focus displacement sensors being interposed therebetween, in which the vertical direction error acquisition section acquires the vertical position of the container at the positions of the auto-focus displacement sensors, on the basis of the vertical position of the container detected by the two first position measurement displacement sensors.

Further, according to the above aspects of the present invention, the observation device may include two second position measurement displacement sensors that are provided in parallel in the sub-scanning direction at the same position as the position of the imaging optical system in the main scanning direction with the imaging optical system being interposed therebetween, in which the vertical direction error acquisition section may acquire the vertical position of the container at a scanning position in the observation region of the imaging optical system, on the basis of the vertical position of the container detected by the two second position measurement displacement sensors.

Further, according to the above aspects of the present invention, in the observation device, the vertical direction error acquisition section may have a table in which each observation position in the container is associated with the error at each observation position.

Further, according to the above aspects of the present invention, in the observation device, the table may be updated at a preset time.

Further, in the above aspects of the present invention, the operation section may include a piezoelectric element, and may perform the second and third operations by the piezoelectric element.

In addition, in the observation device according to the present invention, the auto-focus displacement sensor may be a laser displacement sensor.

According to still another aspect of the present invention, there is provided an observation method for moving at least one of a container in which an observation target is contained, or an imaging optical system having an imaging lens that forms an image of the observation target in the container in a horizontal plane, to scan each observation position in the container in an observation region of the imaging optical system and capture an image of the observation target imaged by the imaging optical system using an imaging element, including: a step of precedently detecting a vertical position of the container at the observation position before the observation region reaches the observation position in the container, through the scan in the observation region of the imaging optical system; a step of acquiring an error between a vertical position of the container at a time point when the vertical position of the container is precedently detected at the observation position and a vertical position of the container at a time point when the observation region of the imaging optical system is scanned up to the observation position; and a step of performing at least one of a first operation of changing a focal length of the imaging optical system, a second operation of moving the imaging lens in an optical axis direction, a third operation of moving the imaging element in the optical axis direction, or a fourth operation of moving the container in the optical axis direction, when the observation position is scanned by the observation region of the imaging optical system, on the basis of the vertical position of the container at the observation position that is precedently detected and the error.

According to still another aspect of the present invention, there is provided an observation method for moving at least one of a container in which an observation target is contained, or an imaging optical system having an imaging lens that forms an image of the observation target in the container in a horizontal plane, to scan each observation position in the container in an observation region of the imaging optical system, including: a step of precedently detecting a vertical position of the container at the observation position before the observation region reaches the observation position in the container, through the scan in the observation region of the imaging optical system; a step of acquiring an error between a vertical position of the container at a time point when the vertical position of the container is precedently detected at the observation position and a vertical position of the container at a time point when the observation region of the imaging optical system is scanned up to the observation position; and a step of performing at least one of a first operation of changing a focal length of the imaging optical system, a second operation of moving the imaging lens in an optical axis direction, or a fourth operation of moving the container in the optical axis direction, when the observation position is scanned by the observation region of the imaging optical system, on the basis of the vertical position of the container at the observation position that is precedently detected and the error.

According to still another aspect of the present invention, there is provided an observation device control program that causes a computer to execute an observation method for moving at least one of a container in which an observation target is contained, or an imaging optical system having an imaging lens that forms an image of the observation target in the container in a horizontal plane, to scan each observation position in the container in an observation region of the imaging optical system and capture an image of the observation target imaged by the imaging optical system using an imaging element, the program causing the computer to execute: a step of precedently detecting a vertical position of the container at the observation position before the observation region reaches the observation position in the container, through the scan in the observation region of the imaging optical system; a step of acquiring an error between a vertical position of the container at a time point when the vertical position of the container is precedently detected at the observation position and a vertical position of the container at a time point when the observation region of the imaging optical system is scanned up to the observation position; and a step of performing at least one of a first operation of changing a focal length of the imaging optical system, a second operation of moving the imaging lens in an optical axis direction, a third operation of moving the imaging element in the optical axis direction, or a fourth operation of moving the container in the optical axis direction, when the observation position is scanned by the observation region of the imaging optical system, on the basis of the vertical position of the container at the observation position that is precedently detected and the error.

According to still another aspect of the present invention, there is provided an observation device control program that causes a computer to execute an observation method for moving at least one of a container in which an observation target is contained, or an imaging optical system having an imaging lens that forms an image of the observation target in the container in a horizontal plane, to scan each observation position in the container in an observation region of the imaging optical system, the program causing the computer to execute: a step of precedently detecting a vertical position of the container at the observation position before the observation region reaches the observation position in the container, through the scan in the observation region of the imaging optical system; a step of acquiring an error between a vertical position of the container at a time point when the vertical position of the container is precedently detected at the observation position and a vertical position of the container at a time point when the observation region of the imaging optical system is scanned up to the observation position; and a step of performing at least one of a first operation of changing a focal length of the imaging optical system, a second operation of moving the imaging lens in an optical axis direction, or a fourth operation of moving the container in the optical axis direction, when the observation position is scanned by the observation region of the imaging optical system, on the basis of the vertical position of the container at the observation position that is precedently detected and the error.

According to still another aspect of the present invention, there is provided an observation device including: a memory that stores a command to be executed by a computer; and a processor configured to execute the stored command, in which the processor executes a process of moving at least one of a container in which an observation target is contained, or an imaging optical system having an imaging lens that forms an image of the observation target in the container in a horizontal plane, to scan each observation position in the container in an observation region of the imaging optical system and capture an image of the observation target imaged by the imaging optical system using an imaging element, and in which the process includes a step of precedently detecting a vertical position of the container at the observation position before the observation region reaches the observation position in the container, through the scan in the observation region of the imaging optical system, a step of acquiring an error between a vertical position of the container at a time point when the vertical position of the container is precedently detected at the observation position and a vertical position of the container at a time point when the observation region of the imaging optical system is scanned up to the observation position, and a step of performing at least one of a first operation of changing a focal length of the imaging optical system, a second operation of moving the imaging lens in an optical axis direction, a third operation of moving the imaging element in the optical axis direction, or a fourth operation of moving the container in the optical axis direction, when the observation position is scanned by the observation region of the imaging optical system, on the basis of the vertical position of the container at the observation position that is precedently detected and the error.

According to still another aspect of the present invention, there is provided an observation device including: a memory that stores a command to be executed by a computer; and a processor configured to execute the stored command, in which the processor executes a process of moving at least one of a container in which an observation target is contained, or an imaging optical system having an imaging lens that forms an image of the observation target in the container in a horizontal plane, to scan each observation position in the container in an observation region of the imaging optical system, and in which the process includes a step of precedently detecting a vertical position of the container at the observation position before the observation region reaches the observation position in the container, through the scan in the observation region of the imaging optical system, a step of acquiring an error between a vertical position of the container at a time point when the vertical position of the container is precedently detected at the observation position and a vertical position of the container at a time point when the observation region of the imaging optical system is scanned up to the observation position, and a step of performing at least one of a first operation of changing a focal length of the imaging optical system, a second operation of moving the imaging lens in an optical axis direction, or a fourth operation of moving the container in the optical axis direction, when the observation position is scanned by the observation region of the imaging optical system, on the basis of the vertical position of the container at the observation position that is precedently detected and the error.

According to the observation device and method, and the observation device control program of the above aspects of the present invention, before the observation region of the imaging optical system reaches the observation position in the container, the vertical position of the container at the observation position is precedently detected by the auto-focus displacement sensor, and at least one of the first operation of changing the focal length of the imaging optical system, the second operation of moving the imaging lens in the optical axis direction, the third operation of moving the imaging element in the optical axis direction, or the fourth operation of moving the container in the optical axis direction is performed on the basis of the detected vertical position of the container. Here, the error between the vertical position of the container at the observation position that is precedently detected by the auto-focus displacement sensor and the vertical position of the container at the time point when the observation region of the imaging optical system is scanned up to the observation position is acquired, and at least one of the first operation to the fourth operation is performed by controlling the operation section, on the basis of the acquired error and the vertical position of the container at the observation position that is precedently detected by the auto-focus displacement sensor, when the observation position is scanned by the observation region of the imaging optical system. Accordingly, it is possible to perform an auto-focus control with high accuracy without being affected by a vertical position change due to the movement of the container.

Further, according to the observation device and method, and the observation device control program of the above aspects of the present invention, before the observation region of the imaging optical system reaches the observation position in the container, the vertical position of the container at the observation position is precedently detected by using the auto-focus displacement sensor, and at least one of the first operation of changing the focal length of the imaging optical system, the second operation of moving the imaging lens in the optical axis direction, or the fourth operation of moving the container in the optical axis direction is performed on the basis of the detected vertical position of the container. Here, the error between the vertical position of the container at the observation position that is precedently detected by the auto-focus displacement sensor and the vertical position of the container at the time point when the observation region of the imaging optical system is scanned up to the observation position is acquired, and at least one of the first operation, the second operation, or the fourth operation is performed by controlling the operation section, on the basis of the acquired error and the vertical position of the container at the observation position that is precedently detected by the auto-focus displacement sensor, when the observation position is scanned by the observation region of the imaging optical system. Accordingly, it is possible to perform an auto-focus control with high accuracy without being affected by a vertical position change due to the movement of the container.

DESCRIPTION OF THE PREFERRED EMBODIMENTS

Figure 1:
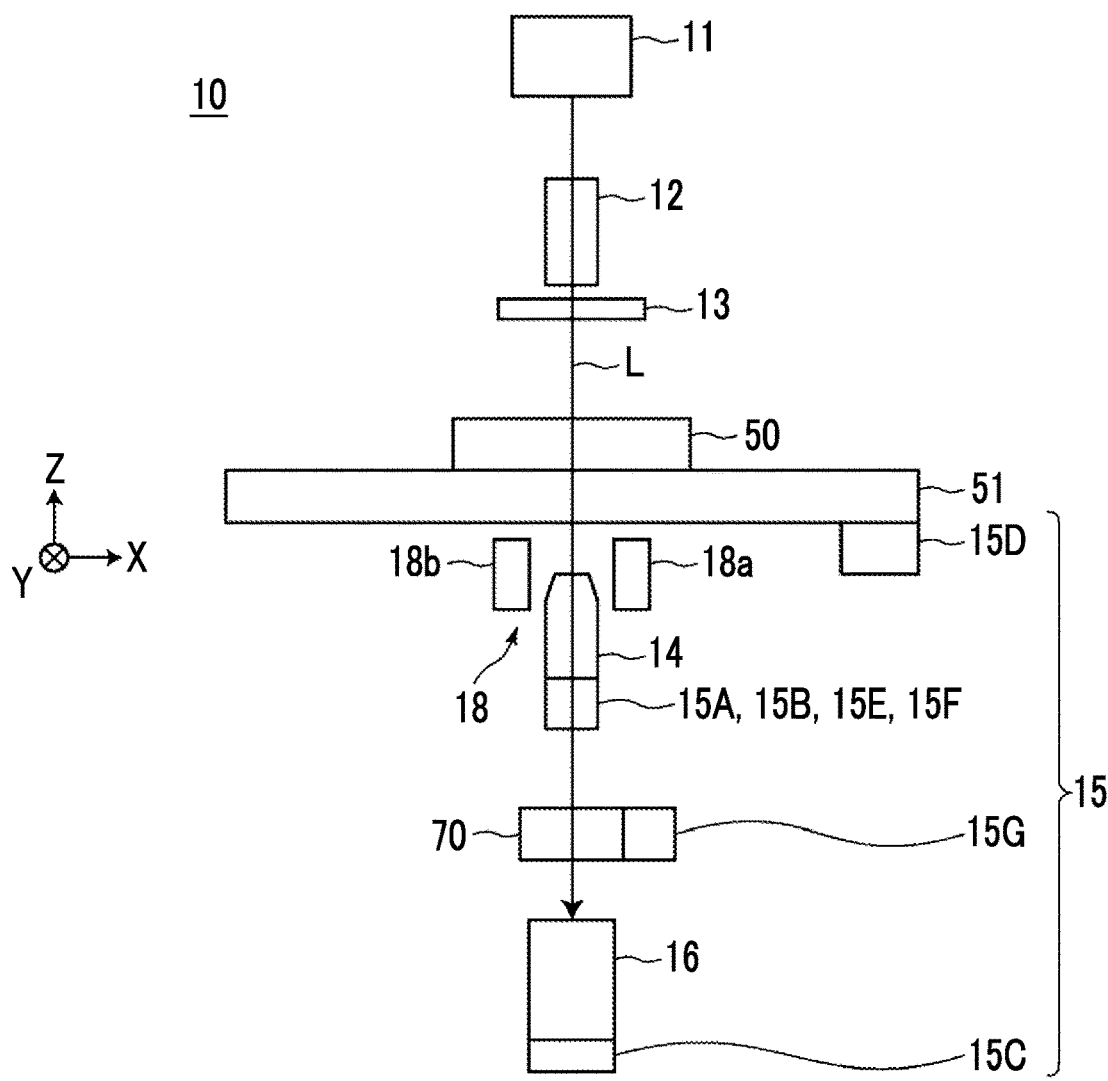
FIG. 1 is a diagram showing a schematic configuration of a microscope observation system that uses an observation device according to an embodiment of the present invention.

Hereinafter, a microscope observation system that uses an observation device, an observation method, and an observation device control program according to an embodiment of the invention will be described in detail with reference to the accompanying drawings. FIG. 1 is a block diagram showing a schematic configuration of a microscope device 10 in a microscope observation system of the embodiment.

The microscope device 10 captures a phase difference image of a cultured cell that is an observation target. Specifically, as shown in FIG. 1, the microscope device 10 includes a white light source 11 that emits white light, a condenser lens 12, a slit plate 13, an imaging optical system 14, an operation section 15, an imaging element 16, and a detection section 18. Further, the microscope device 10 includes a focal length changing optical system 70.

The operation section 15 includes a first operation section 15A, a second operation section 15B, a third operation section 15C, a fourth operation section 15D, a fifth operation section 15E, a sixth operation section 15F, and a seventh operation section 15G. Operations of the first to seventh operation sections 15A to 15G will be described later.

Figure 2:
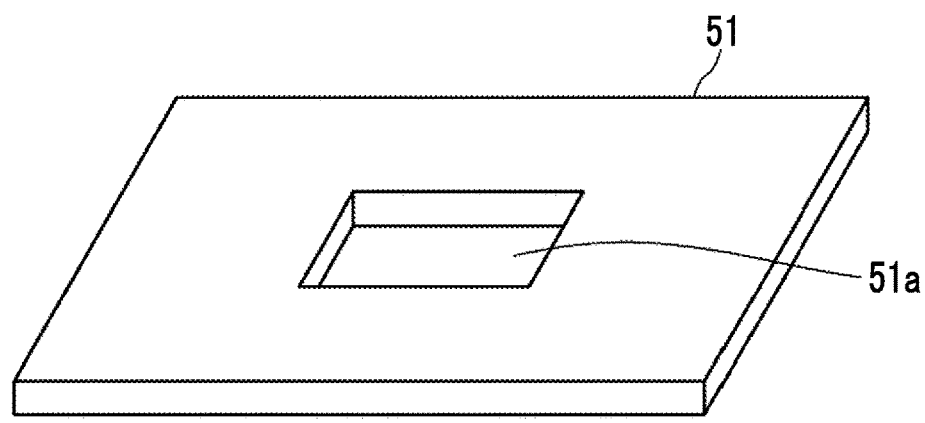
FIG. 2 is a perspective view showing a configuration of a stage.

Further, a stage 51 is provided between the slit plate 13, and the imaging optical system 14 and the detection section 18. A culture container 50 in which cells that are observation targets are contained is installed on the stage 51. FIG. 2 is a diagram showing an example of the stage 51. At the center of the stage 51, a rectangular opening 51a is formed. The culture container 50 is installed on a member that is formed with the opening 51a, and in this configuration, a phase difference image of a cell in the culture container 50 passes through the opening 51a.

The culture container 50 corresponds to a container of the present invention. As the culture container 50, a petri dish, a dish, a flask, a well plate, or the like may be used. Further, as the container, a slide glass, a microchannel device in which a fine channel is processed, or the like may be used. In addition, as cells contained in the culture container 50, multipotential stem cells such as induced pluripotent stem (iPS) cells and embryonic stem (ES) cells, cells of nerves, the skin, the myocardium and the liver, which are differentiated and induced from a stem cell, cells of the skin, the retina, the myocardium, blood corpuscles, nerves, and organs extracted from a human body, and the like, may be used.

Figure 6:
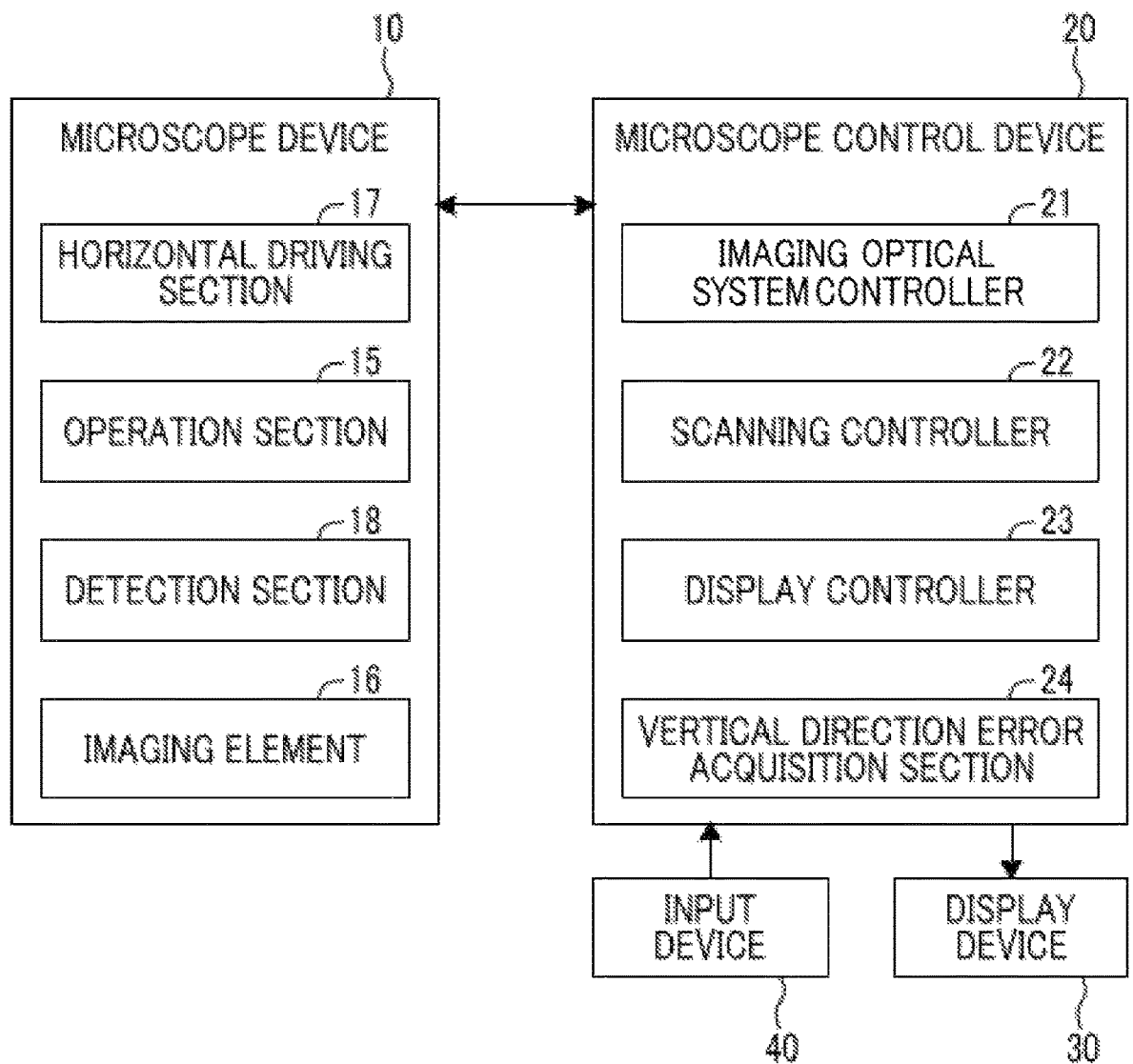
FIG. 6 is a block diagram showing a schematic configuration of the microscope observation system that uses the observation device according to the embodiment of the present invention.

The stage 51 is configured to be moved in an X direction and a Y direction that are orthogonal to each other by a horizontal driving section 17 (see FIG. 6). The X direction and the Y direction are directions that are orthogonal to a Z direction, and are directions that are orthogonal to each other in a horizontal plane. In this embodiment, the X direction is referred to as a main scanning direction, and the Y direction is referred to as a sub-scanning direction. Further, the stage 51 is moved in the Z direction by the fourth operation section 15D as described later.

The slit plate 13 has a configuration in which a ring-shaped slit through which white light passes is formed in a light-shielding plate that shields white light emitted from the white light source 11, and ring-shaped illumination light L is formed as the white light passes through the slit.

Figure 3:
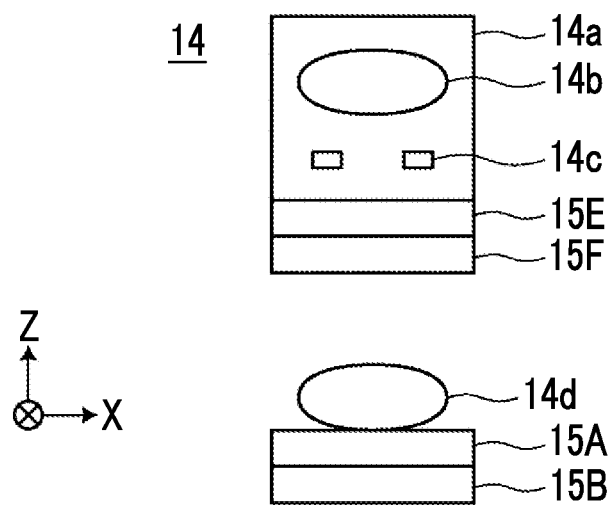
FIG. 3 is a schematic diagram showing a configuration of an imaging optical system.

FIG. 3 is a diagram showing a detailed configuration of the imaging optical system 14. The imaging optical system 14 includes a phase difference lens 14a and an imaging lens 14d, as shown in FIG. 3. The phase difference lens 14a includes an objective lens 14b and a phase plate 14c. The phase plate 14c has a configuration in which a phase ring is formed in a transparent plate that is transparent with respect to a wavelength of the illumination light L. The size of the slit of the above-described slit plate 13 is in a cooperative relation with the phase ring of the phase plate 14c.

The phase ring has a configuration in which a phase membrane that shifts a phase of incident light by ¼ of a wavelength and a dimmer filter that dims incident light are formed in a ring shape. The phase of direct light incident onto the phase ring shifts by ¼ of a wavelength after passing through the phase ring, and its brightness is weakened. On the other hand, most of diffracted light diffracted by an observation target passes through the transparent plate of the phase plate 14c, and its phase and brightness are not changed.

The phase difference lens 14a having the objective lens 14b is moved in the optical axis direction of the objective lens 14b by the fifth operation section 15E of the operation section 15 shown in FIG. 1. The fifth operation section 15E includes an actuator such as a piezoelectric element, for example. In this embodiment, the optical axis direction of the objective lens 14b and a Z direction (vertical direction) are the same direction. As the objective lens 14b is moved in the Z direction, an auto-focus control is performed, and contrast of a phase difference image captured by the imaging element 16 is adjusted.

Further, a configuration in which a magnification of the phase difference lens 14a is changeable may be used.

Specifically, a configuration in which the phase difference lenses 14a or the imaging optical systems 14 having different magnifications are interchangeable may be used. The interchange between the phase difference lens 14a and the imaging optical systems 14 may be automatically performed, or may be manually performed by a user.

Further, the objective lens 14b is formed of a liquid lens whose focal length can be changed. As long as the focal length can be changed, the objective lens 14b is not limited to the liquid lens, and any other lens such as a liquid crystal lens or a shape deformable lens may be used. In the objective lens 14b, an applied voltage is changed by the sixth operation section 15F in the operation section 15 shown in FIG. 1, and thus, the focal length is changed. Thus, the focal length of the imaging optical system 14 is changed. Due to the change of the focal length of the objective lens 14b, similarly, the auto-focus control is performed, and the contrast of the phase difference image captured by the imaging element 16 is adjusted.

The imaging lens 14d receives a phase difference image passed through the phase difference lens 14a, so that an image is formed on the imaging element 16 from the phase difference image. In the present embodiment, the imaging lens 14d is formed of a liquid lens whose focal length can be changed. As long as the focal length can be changed, the objective lens 14b is not limited to the liquid lens, and any other lens such as a liquid crystal lens or a shape deformable lens may be used. In the imaging lens 14d, an applied voltage is changed by the first operation section 15A in the operation section 15 shown in FIG. 1, and the focal length is changed. Thus, the focal length of the imaging optical system 14 is changed. Due to the change of the focal length of the imaging lens 14d, similarly, the auto-focus control is performed, and the contrast of the phase difference image captured by the imaging element 16 is adjusted.

The imaging lens 14d is moved in the optical axis direction of the imaging lens 14d by the second operation section 15B in the operation section 15 shown in FIG. 1. The second operation section 15B includes an actuator such as a piezoelectric element, for example. In this embodiment, the optical axis direction of the imaging lens 14d and the Z direction (vertical direction) are the same direction. As the imaging lens 14d is moved in the Z direction, the auto-focus control is performed, and the contrast of the phase difference image captured by the imaging element 16 is adjusted.

The imaging element 16 captures an image on the basis of the phase difference image formed by the imaging lens 14d. As the imaging element 16, a charge-coupled device (CCD) image sensor, a complementary metal-oxide semiconductor (CMOS) image sensor, or the like may be used. As the imaging element, an imaging element in which color filters of red, green, and blue (R, G, and B) are provided may be used, or a monochromic imaging element may be used.

Further, the imaging element 16 is moved in the Z direction by the third operation section 15C in the operation section 15 shown in FIG. 1. The third operation section 15C includes an actuator such as a piezoelectric element, for example. In the present embodiment, a direction perpendicular to an imaging surface of the imaging element 16 and the Z direction are the same direction. As the imaging element 16 is moved in the Z direction, similarly, the auto-focus control is performed, and the contrast of the phase difference image captured by the imaging element 16 is adjusted.

Further, the stage 51 is moved in the Z direction by the fourth operation section 15D, and thus, the culture container 50 is moved in the Z direction. The fourth operation section 15D includes an actuator such as a piezoelectric element, for example. In the present embodiment, a direction perpendicular to a surface of the stage 51 on which the culture container 50 is installed and the Z direction are the same direction. As the stage 51 is moved in the Z direction, similarly, the auto-focus control is performed, and the contrast of the phase difference image captured by the imaging element 16 is adjusted.

Figure 4:
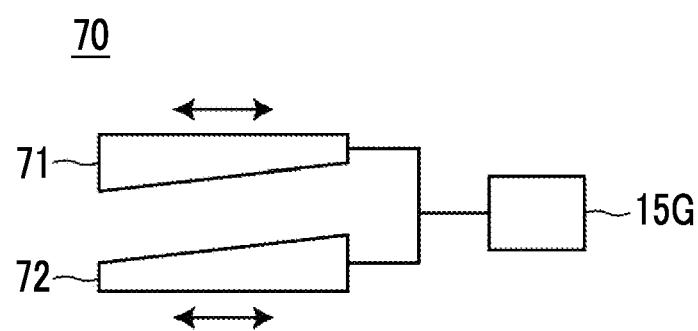
FIG. 4 is a schematic diagram showing a configuration of a focal length changing optical system.

FIG. 4 is a schematic diagram showing a configuration of the focal length changing optical system. As shown in FIG. 4, the focal length changing optical system 70 includes a circular first wedge prism 71 and a circular second wedge prism 72. The seventh operation section 15G moves the first wedge prism 71 and the second wedge prism 72 to be synchronized with each other in opposite directions. With this configuration, focal positions of the imaging optical system 14 are changed.

The change of the focal position means that the focal length increases or decreases. Thus, as the focal position of the imaging optical system 14 is changed, the focal length of the imaging optical system 14 is changed. In the present embodiment, the change of the focal length of the imaging optical system 14 includes the change of the focal length of the imaging lens 14d by the first operation section 15A, and the change of the objective lens 14b by the sixth operation section 15F, and additionally, the change of the focal position of the imaging optical system 14 due to the change of the focal length of the imaging optical system 14 by the seventh operation section 15G.

The first and second wedge prisms 71 and 72 are prisms in which two surfaces that can be a light incident surface and a light emitting surface are not parallel, that is, one surface is inclined with respect to the other surface. In the following description, a surface arranged perpendicular to the optical axis is referred to as a right-angled surface, and a surface arranged inclined with respect to the optical axis is referred to as a wedge surface. The wedge prisms 71 and 72 are prisms that deflect light that is incident perpendicularly to the right-angled surfaces. The seventh operation section 15G includes an actuator such as a piezoelectric element, for example, and moves the first wedge prism 71 and the second wedge prism 72 to be synchronized with each other in opposite directions on the basis of control signals output from the operation controller 21 (which will be described later), while maintaining the right-angled surfaces in parallel. That is, in a case where the first wedge prism 71 is moved rightward in FIG. 4, the second wedge prism 72 is moved leftward. Conversely, in a case where the first wedge prism 71 is moved leftward in FIG. 4, the second wedge prism 72 is moved rightward. As described above, by moving the first and second wedge prisms 71 and 72, an optical path length of light emitted from the imaging optical system 14 is changed, so that the focal position of the imaging optical system 14 is changed, to thereby make it possible to change the focal length. Accordingly, the auto-focus control is performed, and contrast of a phase difference image captured by the imaging element 16 is adjusted.

The detection section 18 detects a Z-directional (vertical direction) position at each observation position in the culture container 50 installed on the stage 51. Specifically, the detection section 18 includes a first auto-focus displacement sensor 18a and a second auto-focus displacement sensor 18b. The first auto-focus displacement sensor 18a and the second auto-focus displacement sensor 18b are provided in parallel in the X direction as shown in FIG. 1 with the imaging optical system 14 being interposed therebetween. The first auto-focus displacement sensor 18a and the second auto-focus displacement sensor 18b in this embodiment are laser displacement meters, which irradiate the culture container 50 with laser light and detect its reflection light to detect a Z-directional position of a bottom surface of the culture container 50. The bottom surface of the culture container 50 refers to a boundary surface between a bottom portion of the culture container 50 and cells that are observation targets, that is, a surface on which the observation targets are installed.

Information on the Z-directional position of the culture container 50 detected by the detection section 18 is output to an operation controller 21, and the operation controller 21 controls the operation section 15 on the basis of the input position information to perform the auto-focus control.

More specifically, in the microscope device 10 according to the embodiment, before an observation region of the imaging optical system 14 reaches each observation position in the culture container 50 on the stage 51, information on the Z-directional position of the culture container 50 at the observation position is precedently detected by the first or second auto-focus displacement sensor 18a or 18b, and the operation section 15 is controlled on the basis of the position information, to thereby perform the auto-focus control.

Here, as in the embodiment, in a case where an image of an observation target in the culture container 50 installed on the stage 51 is observed while moving the stage 51 in the X direction and the Y direction, a Z-directional position of the stage 51 is not always constant, but the Z-directional position is changed according to the X-directional position of the stage 51, due to mechanical accuracy of the horizontal driving section 17 (which will be described later) for moving the stage 51. That is, a so-called "undulation" occurs in the movement of the stage 51.

Accordingly, as in the embodiment, in a case where the information on the Z-directional position at the observation position of the culture container 50 is precedently detected by the first or second auto-focus displacement sensor 18a or 18b and the operation section 15 is to be controlled on the basis of the position information, since the first or second auto-focus displacement sensor 18a or 18b and the objective lens 14b have different X-directional positions with respect to a predetermined observation position in the culture container 50, a detection timing of the Z-directional position in the first or second auto-focus displacement sensor 18a or 18b and an observation timing in the objective lens 14b become different from each other.

Figure 5:
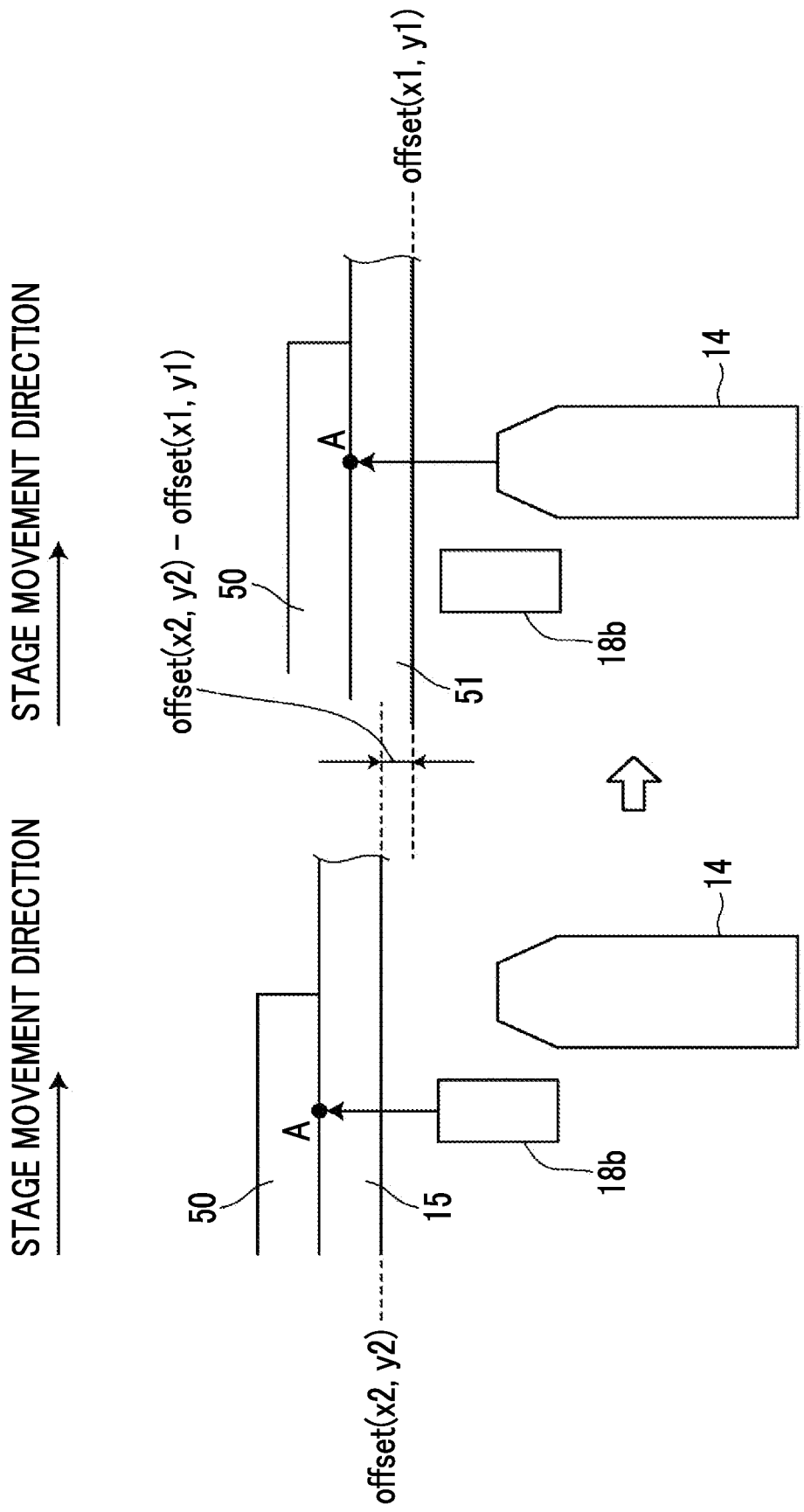
FIG. 5 is a diagram illustrating a position change in a Z direction due to movement of the stage.

Accordingly, for example, as shown in FIG. 5, in a case where with respect to an observation position A in the culture container 50, a Z-directional position (offset (x2, y2)) of the stage 51 at a time point when the Z-directional position is detected by the second auto-focus displacement sensor 18b and a Z-directional position (offset (x1, y1)) of the stage 51 at a time point when the observation position A is moved to a position of the observation region of the imaging optical system 14 are different from each other, it is difficult to perform an appropriate auto-focus control.

Thus, in this embodiment, an error (offset (x2, y2)−offset (x1, y1)) between the Z-directional position (offset (x2, y2)) of the stage 51 at the time point when the Z-directional position of the observation position A is detected by the second auto-focus displacement sensor 18b shown in FIG. 5 and the Z-directional position (offset (x1, y1)) of the stage 51 at the time point when the observation region of the imaging optical system 14 is moved to the observation position A is acquired, and the auto-focus control is performed in consideration of the error. The auto-focus control in consideration of the error due to "undulation" of the stage movement will be described in detail later.

Then, a configuration of the microscope control device 20 that controls the microscope device 10 will be described. FIG. 6 is a block diagram showing a configuration of the microscope observation system according to this embodiment. With respect to the microscope device 10, a block diagram of a partial configuration controlled by respective sections of the microscope control device 20 is shown.

The microscope control device 20 generally controls the microscope device 10, and particularly, includes an operation controller 21, a scanning controller 22, a display controller 23, and a vertical direction error acquisition section 24.

The microscope control device 20 is configured of a computer including a central processing unit, a semiconductor memory, a hard disk, and the like. An embodiment of an observation device control program of the invention is installed in the hard disk. Further, as the observation device control program is executed by the central processing unit, the operation controller 21, the scanning controller 22, the display controller 23, and the vertical direction error acquisition section 24 shown in FIG. 6 execute their functions.

The operation controller 21 performs the auto-focus control by operating the operation section 15 on the basis of the information on the Z-directional position of the culture container 50 detected by the detection section 18 as described above. The operation controller 21 stores relationships between the information on the Z-directional position of the culture container 50, a voltage applied to the imaging lens 14d for changing the focal length of the imaging lens 14d, the amount of movement of the imaging lens 14d in the optical axis direction, the amount of movement of the imaging element 16 in the optical axis direction, the amount of movement of the stage 51 in the optical axis direction, the amount of movement of the objective lens 14b in the optical axis direction, a voltage applied to the objective lens 14b for changing the focal length of the objective lens 14b, and the amount of movement of the focal length changing optical system 70 in advance as a table. This table is referred to as a first table.

The operation controller 21 obtains the voltage applied to the imaging lens 14d for changing the focal length of the imaging lens 14d, the amount of movement of the imaging lens 14d in the optical axis direction, the amount of movement of the imaging element 16 in the optical axis direction, the amount of movement of the stage 51 in the optical axis direction, the amount of movement of the objective lens 14b in the optical axis direction, the voltage applied to the objective lens 14b for changing the focal length, and the amount of movement of the focal length changing optical system 70, with reference to the first table, on the basis of the input information on the Z-directional position of the culture container 50. In the following description, the voltage applied to the imaging lens 14d for changing the focal length of the imaging lens 14d, the amount of movement of the imaging lens 14d in the optical axis direction, the amount of movement of the imaging element 16 in the optical axis direction, the amount of movement of the stage 51 in the optical axis direction, the amount of movement of the objective lens 14b in the optical axis direction, the voltage applied to the objective lens 14b for changing the focal length of the objective lens 14b, and the amount of movement of the focal length changing optical system 70 are referred to as focus control amounts.

The operation controller 21 outputs control signals corresponding to the focus control amounts to the first operation section 15A to the seventh operation section 15G in order to control the operation section 15. In the present embodiment, an error of the stage 51 acquired as described later is actually subtracted from the position information, and the focus control amounts are acquired with reference to the first table on the basis of the subtraction value. Thus, the focal length of the imaging lens 14d is changed by the first operation section 15A, and thus, the focal length of the imaging optical system 14 is changed. Further, the imaging lens 14d is moved in the optical axis direction by the second operation section 15B. The imaging element 16 is moved in the optical axis direction by the third operation section 15C. Further, the stage 51 is moved in the optical axis direction by the fourth operation section 15D. In addition, the objective lens 14b is moved in the optical axis direction by the fifth operation section 15E. The focal length of the objective lens 14b is changed by the sixth operation section 15F, and thus, the focal length of the imaging optical system 14 is changed. Further, the focal position of the imaging optical system 14 is changed by the seventh operation section 15G, and thus, the focal length of the imaging optical system 14 is changed. Through these seven operations, the auto-focus control is performed.

The change of the focal length of the imaging lens 14d by the first operation section 15A, the change of the focal length of the objective lens 14b by the sixth operation section 15F, and the change of the focal length changing optical system 70 by the seventh operation section 15G correspond to a first operation. The movement of the imaging lens 14d in the optical axis direction by the second operation section 15B corresponds to a second operation. The movement of the imaging element 16 in the optical axis direction by the third operation section 15C corresponds to a third operation. The movement of the stage 51 in the optical axis direction by the fourth operation section 15D corresponds to a fourth operation. The movement of the objective lens 14b in the optical axis direction by the fifth operation section 15E corresponds to a fifth operation.

The scanning controller 22 drives and controls the horizontal driving section 17, to thereby move the stage 51 in the X direction and the Y direction, and move the culture container 50 in the X direction and the Y direction. The horizontal driving section 17 is configured by an actuator such as a piezoelectric element.

Figure 7:
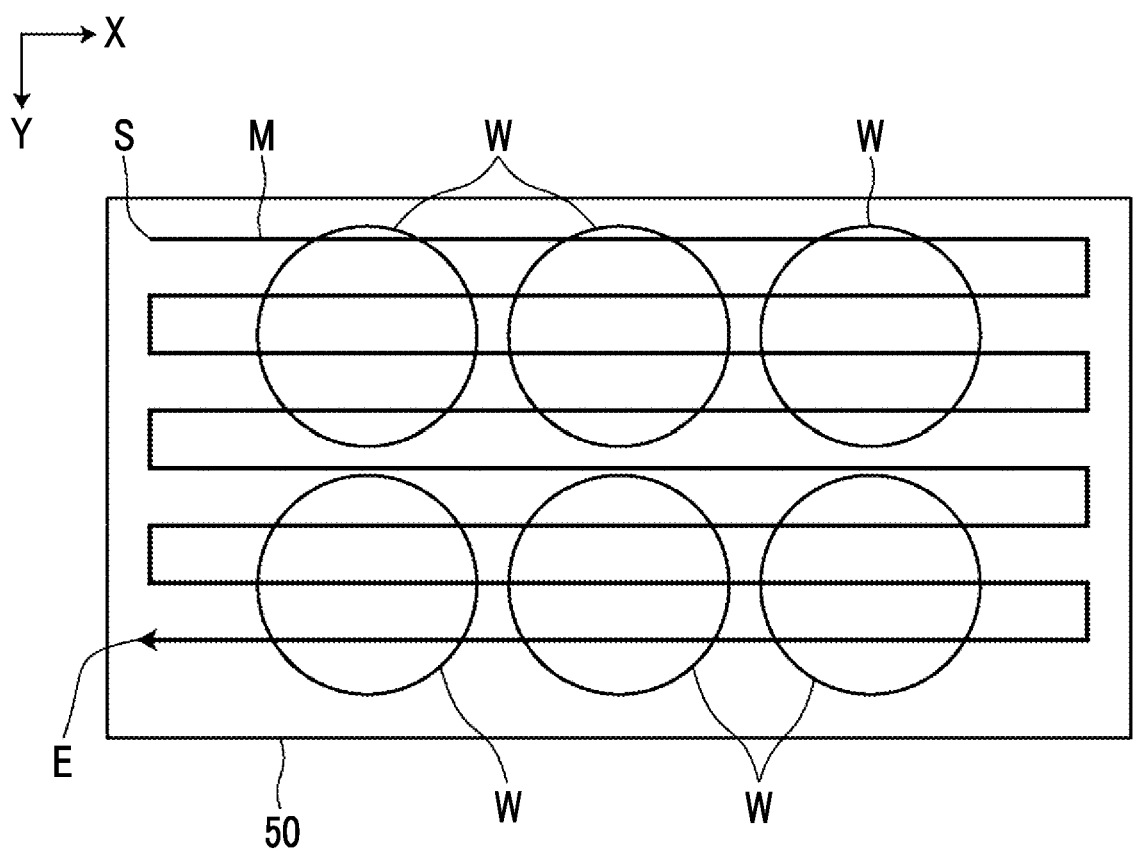
FIG. 7 is a diagram showing a scanning position in an observation region of the imaging optical system in a culture container.

In this embodiment, as described above, the stage 51 is moved in the X direction and the Y direction under the control of the main scanning controller 22, so that the observation region of the imaging optical system 14 is moved in a two-dimensional manner in the culture container 50 to scan the culture container 50, and a phase difference image at each observation position in the culture container 50 is captured. FIG. 7 is a diagram showing a scanning position of an observation region in the culture container 50 using a solid line M. In this embodiment, a well plate having six wells W is used as the culture container 50.

As shown in FIG. 7, the observation region of the imaging optical system 14 is moved from a scanning start point S to a scanning end point E along a solid line M, by the movement of the stage 51 in the X direction and the Y direction. That is, the observation region of the imaging optical system 14 is moved in a positive direction (a rightward direction in FIG. 7) of the X direction, is moved in the Y direction (a downward direction in FIG. 7), and then, is moved in a reverse negative direction (in a leftward direction in FIG. 7). Then, the observation region of the imaging optical system 14 is moved in the Y direction again, and then, is scanned in the positive direction of the X direction again. In this way, by repeating the reciprocating movement in the X direction and the movement in the Y direction by the movement of the stage 51, the observation region of the imaging optical system 14 is scanned in the culture container 50 in a two-dimensional manner.

Figure 8:
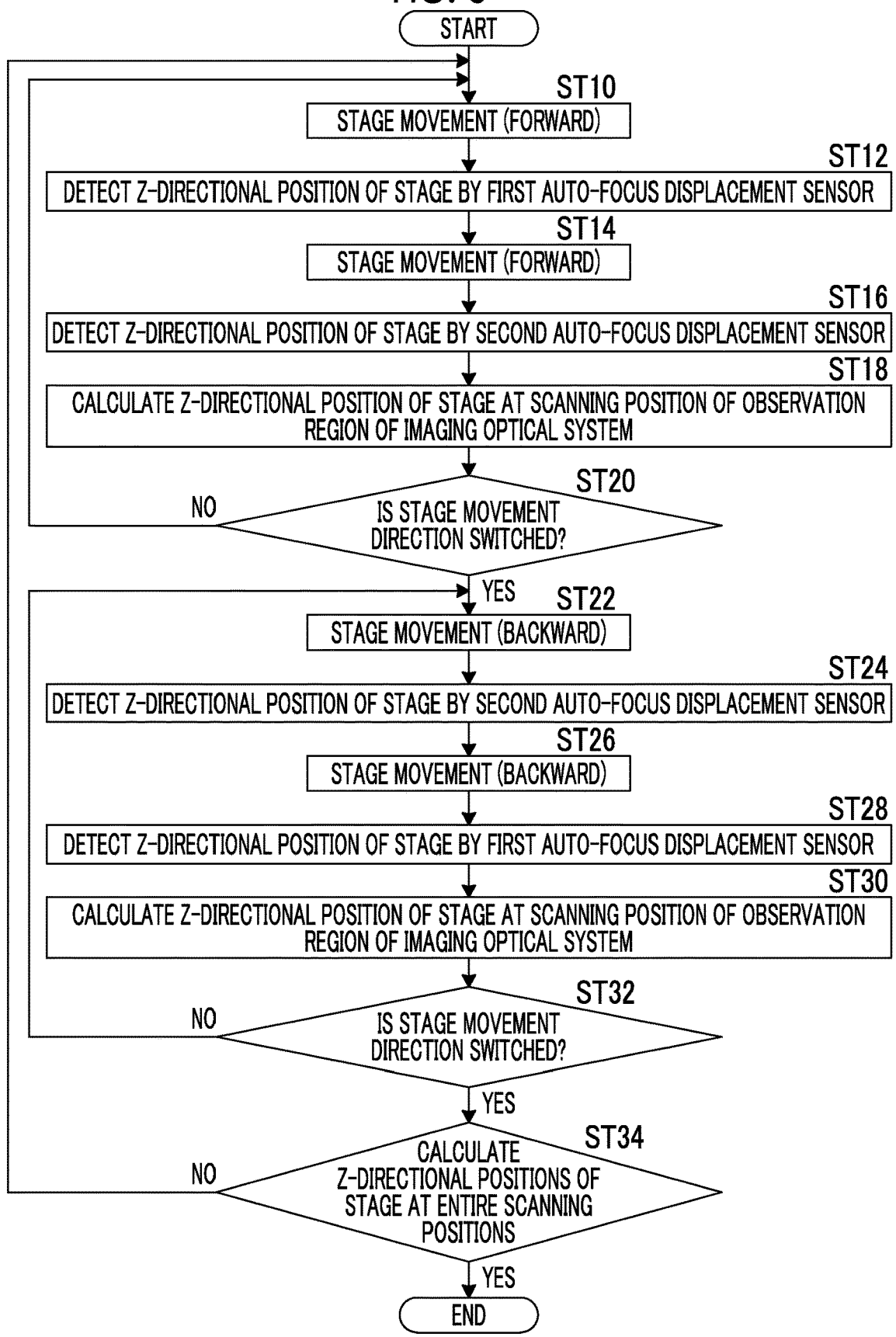
FIG. 8 is a flowchart illustrating a method for acquiring a table in which an error of a Z-directional position of the stage is set.

The vertical direction error acquisition section 24 acquires an error of the Z-directional position that occurs by the above-mentioned "undulation" of the movement of the stage 51. Specifically, in the vertical direction error acquisition section 24, a table in which an error of the Z-directional position of the stage 51 is set in advance with respect to each observation position in the culture container 50 installed on the stage 51 is stored. Hereinafter, the table is referred to as a second table. The vertical direction error acquisition section 24 acquires the error of the Z-directional position of the stage 51 at each observation position in the culture container 50 with reference to the second table. The error of the Z-directional position of the stage 51 coincides with the error of the Z-directional position of the culture container 50. Hereinafter, a method for setting the second table will be described with reference to a flowchart shown in FIG. 8, and FIGS. 9 and 10.

Figure 9:
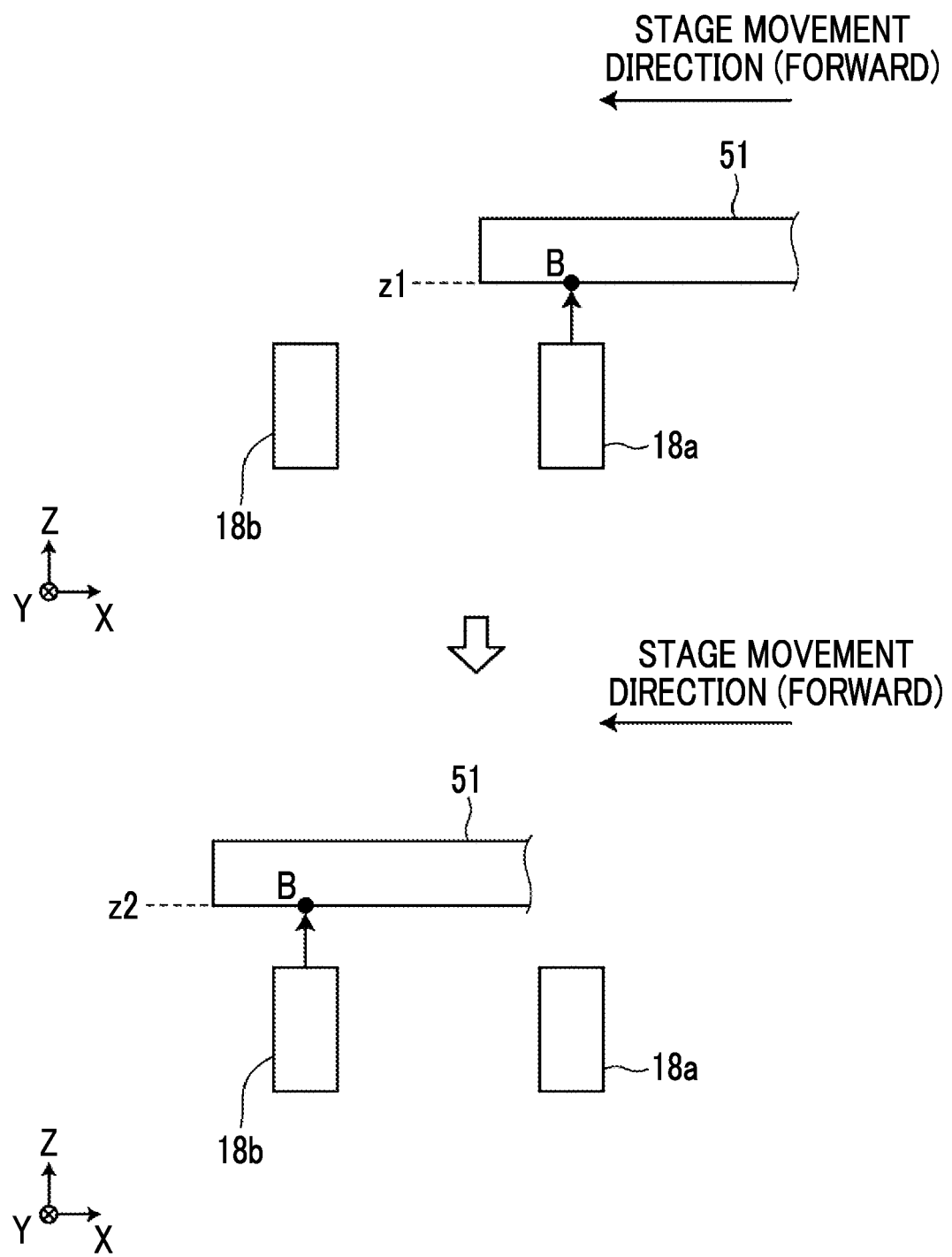
FIG. 9 is a schematic diagram illustrating the method for acquiring the table in which the error of the Z-directional position of the stage is set.

First, forward movement of the stage 51 is started (step ST10), and as shown in FIG. 9, a Z-directional position of a predetermined position B of the stage 51 is detected by the first auto-focus displacement sensor 18a (step ST12). The Z-directional position of the stage 51 refers to a position of a bottom surface of the stage 51, in this embodiment.

Then, as shown in FIG. 9, the stage 51 is moved forward (Step ST14), at a time point when the predetermined position B of the stage 51 is moved to the position of the second auto-focus displacement sensor 18b, the Z-directional position of the predetermined position B is detected (step ST16).

Further, on the basis of a Z-directional position z1 of the predetermined position B detected by the first auto-focus displacement sensor 18a and a Z-directional position z2 of the predetermined position B detected by the second auto-focus displacement sensor 18b, the Z-directional position of the stage 51 at the scanning position in the observation region of the imaging optical system 14 is calculated (step ST18). Specifically, in this embodiment, since the imaging optical system 14 is disposed at a middle position between the first auto-focus displacement sensor 18a and the second auto-focus displacement sensor 18b in the X direction, an average value of the Z-directional position z1 and the Z-directional position z2 is calculated as a Z-directional position z3 of the stage 51 at the scanning position in the observation region of the imaging optical system 14.

Further, until the forward movement of the stage 51 is terminated (NO in step ST20), the processes of steps ST10 to ST18 are repeated, and the Z-directional position z3 of the stage 51 at each scanning position in the observation region of the imaging optical system 14 is acquired with respect to a forward path.

Figure 10:
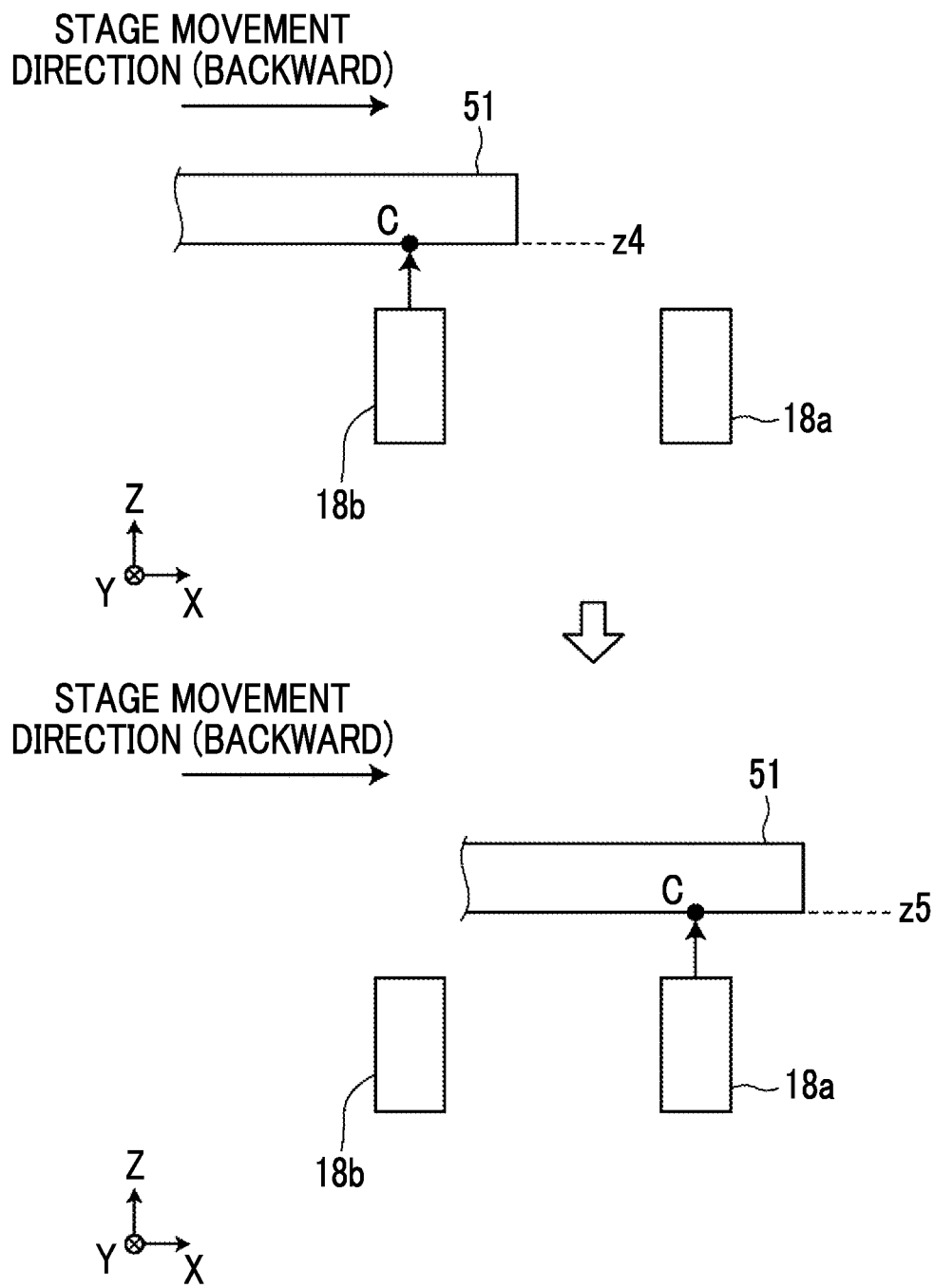
FIG. 10 is a schematic diagram illustrating the method for acquiring the table in which the error of the Z-directional position of the stage is set.

Then, in a case where the forward movement of the stage 51 is terminated, and then, the movement of the stage 51 is switched to returning movement (YES in step ST20, and step ST22), as shown in FIG. 10, a Z-directional position of a predetermined position C of the stage 51 is detected by the second auto-focus displacement sensor 18b (step ST24).

Then, as shown in FIG. 10, the stage 51 is moved backward (step ST26), and at a time point when the predetermined position C of the stage 51 is moved to the position of the first auto-focus displacement sensor 18a, the Z-directional position of the predetermined position C is detected (step ST28).

Further, on the basis of a Z-directional position z4 of the predetermined position B detected by the second auto-focus displacement sensor 18b and a Z-directional position z5 of the predetermined position B detected by the first auto-focus displacement sensor 18a, a Z-directional position z6 of the stage 51 at the scanning position in the observation region of the imaging optical system 14 is calculated (step ST30). Specifically, similar to the case of the forward movement, an average value of the Z-directional position z4 and the Z-directional position z5 is calculated as the Z-directional position z6 of the stage 51 at the scanning position in the observation region of the imaging optical system 14.

Further, until the returning movement of the stage 51 is terminated (NO in step ST32), the processes of steps ST22 to ST30 are repeated, and the Z-directional position z6 of the stage 51 at each scanning position in the observation region of the imaging optical system 14 is acquired with respect to a returning path.

Then, at a time point when the returning movement of the stage 51 is terminated, in a case where the Z-directional positions of the stage 51 at the entire scanning positions in the observation region are not calculated (YES in step ST32 and NO in step ST34), again, the movement of the stage 51 is switched to the forward movement, and the processes of steps ST10 to ST32 are repeatedly performed. On the other hand, at the time point when the returning movement of the stage 51 is terminated, in a case where the Z-directional positions of the stage 51 at the entire scanning positions in the observation region are calculated (YES in step ST34), the process is terminated as it is.

Further, with respect to the forward movement, the error of the Z-directional position of the stage 51 is calculated by subtracting the Z-directional position z3 of the stage 51 calculated using the Z-directional position z1 from the Z-directional position z1 of the stage 51 detected by the first auto-focus displacement sensor 18a. Similarly, with respect to each observation position in the culture container 50, the error of the Z-directional position of the stage 51 is calculated, and is set in the vertical direction error acquisition section 24 as a second table.

Further, with respect to the returning movement, the error of the Z-directional position of the stage 51 is calculated by subtracting the Z-directional position z6 of the stage 51 calculated using the Z-directional position z4 from the Z-directional position z4 of the stage 51 detected by the second auto-focus displacement sensor 18b. Similarly, with respect to each observation position in the culture container 50, the error of the Z-directional position of the stage 51 is calculated. Further, a second table in which each observation position in the culture container 50 and the error of the Z-directional position of the stage 51 at each observation position are associated with each other is set in the vertical direction error acquisition section 24.

It is preferable that the second table set in the vertical direction error acquisition section 24 is updated at an interval of a preset time. Specifically, for example, in a case where imaging such as time lapse imaging is performed plural times in a time-dependent manner, it is preferable to update the second table for each imaging. The invention is not limited thereto, and the second table may be periodically updated, for example, everyday or every month. By updating the second table as described above, it is possible to handle a change due to deterioration of a stage moving mechanism with the lapse of time, for example.

Further, in this embodiment, when the second table is acquired, different errors are acquired in a case where the stage 51 is moved forward and in a case where the stage 51 is moved backward. Since there is a case where the stage 51 shows different position changes in the Z direction between the forward movement and the returning movement, by acquiring different errors between the forward movement and the returning movement as described above, it is possible to perform error measurement with higher accuracy.

Next, returning to FIG. 6, the display controller 23 combines phase difference images at the respective observation positions imaged by the microscope device 10 to generate one composite phase difference image, and displays the composite phase difference image on the display device 30.

The display device 30 displays the composite phase difference image generated by the display controller 23 as described above. For example, the display device 30 includes a liquid crystal display, or the like. Further, the display device 30 may be formed by a touch panel, and may also be used as the input device 40.

The input device 40 includes a mouse, a keyboard, and the like, and receives various setting inputs by the user. The input device 40 according to this embodiment receives a setting input such as a change command of the magnification of the phase difference lens 14a or a change command of the moving velocity of the stage 51, for example.

Figure 11:
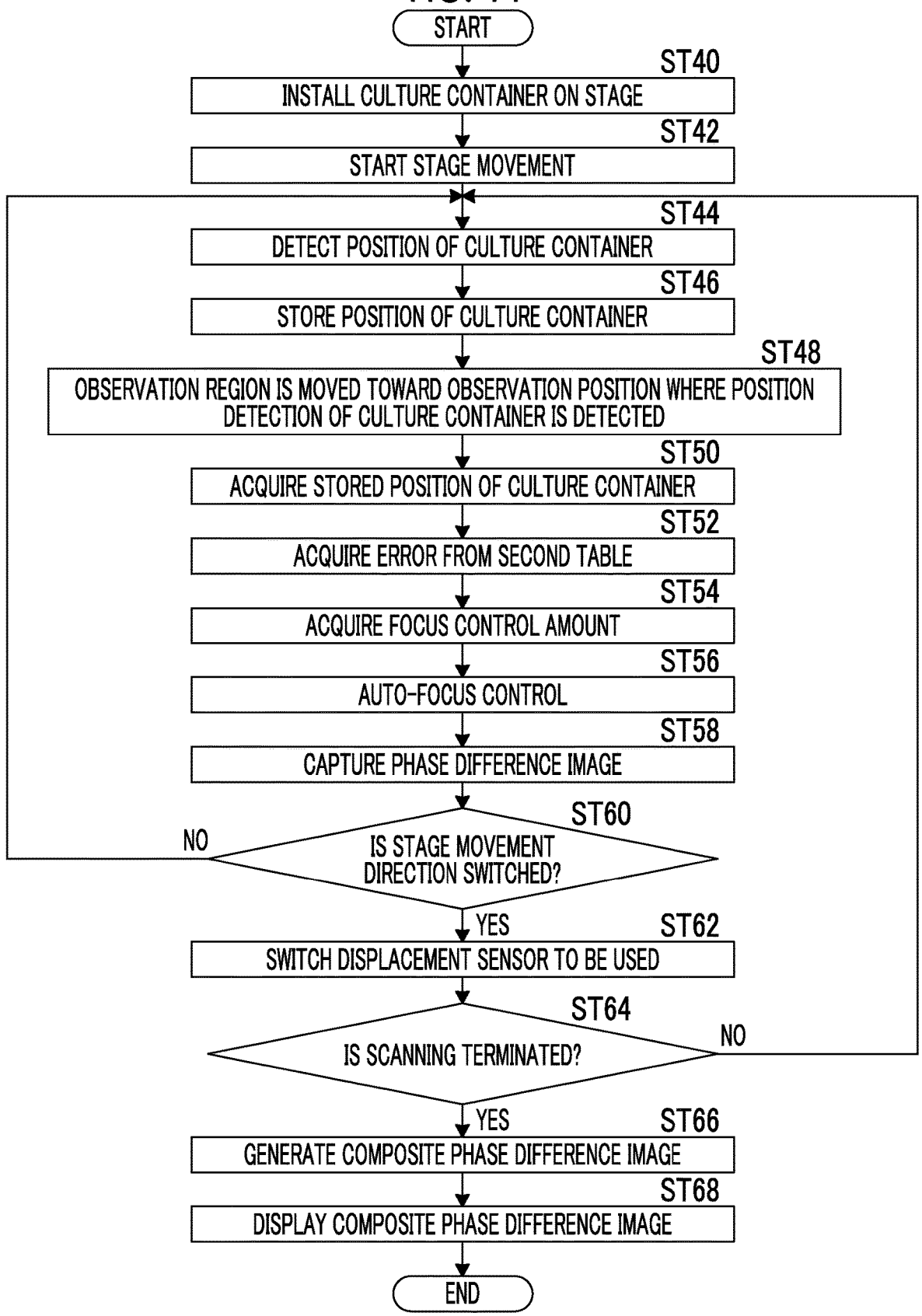
FIG. 11 is a flowchart illustrating an operation of the microscope observation system that uses the observation device according to the embodiment of the invention.

Next, an operation of the microscope observation system according to this embodiment will be described with reference to a flowchart shown in FIG. 11. First, the culture container 50 in which cells that are observation targets are contained is installed on the stage 51 (step ST40). Then, movement of the stage 51, namely, movement of the culture container 50 is started so that the observation region of the imaging optical system 14 is set at the position of the scanning start point S shown in FIG. 7 through the movement of the stage 51 (step ST42).

Here, in this embodiment, as described above, the Z-directional position of the culture container 50 is precedently detected with respect to each observation position in the culture container 50, and at a time point when the observation region of the imaging optical system 14 is moved up to the observation position, imaging for a phase difference image is performed. Further, the detection of the Z-directional position of the culture container 50 and the imaging for the phase difference image are performed while moving the observation region of the imaging optical system 14, and imaging for a phase difference image at a certain observation position and detection of the Z-directional position of the culture container 50 at a forward position in the main scanning direction with reference to the observation position are performed in parallel.

Figure 12:
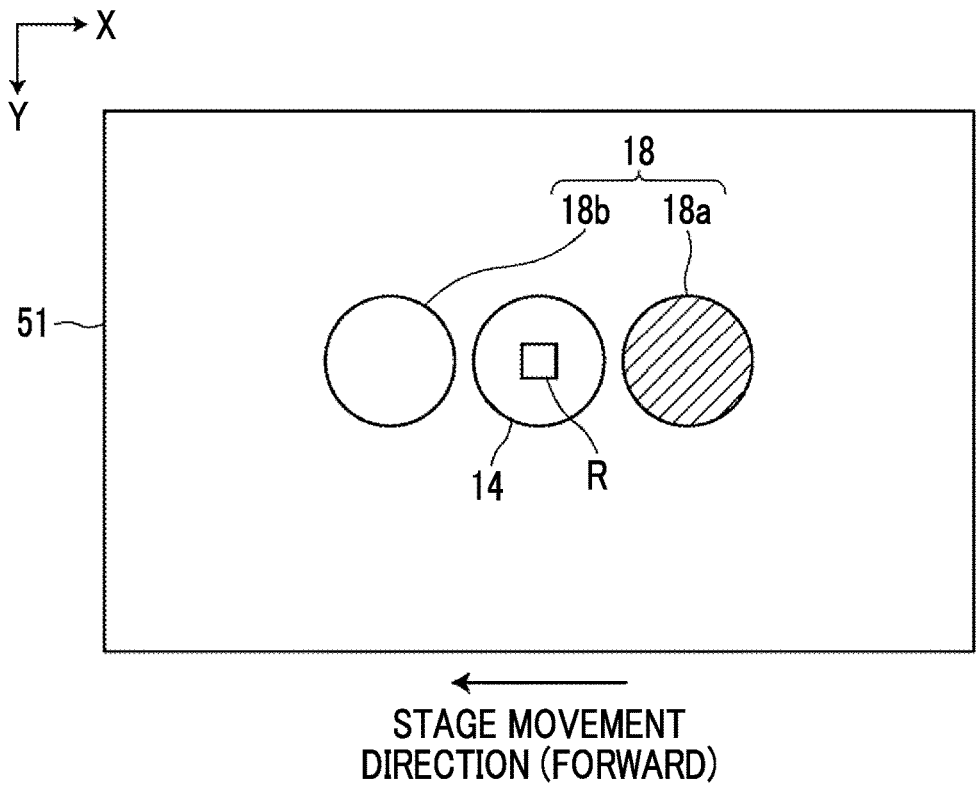
FIG. 12 is a schematic diagram illustrating another operation of the microscope observation system in a case where the stage is moving forward.

Specifically, in a case where the stage 51 is moved forward in an arrow direction shown in FIG. 12, the Z-directional position of the culture container 50 is detected by the auto-focus displacement sensor disposed in front of the main scanning direction with reference to the imaging optical system 14, that is, the first auto-focus displacement sensor 18a in this example (step ST44), and information on the detected position is acquired by the operation controller 21. The operation controller 21 stores the acquired information on the Z-directional position of the culture container 50 together with X-Y coordinates of the detected position of the culture container 50 (step ST46).

Then, an observation region R of the imaging optical system 14 is moved toward an observation position where the position detection of the culture container 50 is performed by the first auto-focus displacement sensor 18a in step ST44 (step ST48). Further, the operation controller 21 reads out the information on the Z-directional position of the culture container 50 that is precedently detected by the first auto-focus displacement sensor 18*a* immediately before the observation region R reaches the observation position where the position detection of the culture container 50 is performed (step ST50). Further, the operation controller 21 acquires an error of the Z-directional position of the stage 51 at the observation position at a time point when the observation region is moved up to the observation position where the position detection of the culture container 50 is performed, namely, an error of the Z-directional position of the culture container 50, with reference to the second table set in the vertical direction error acquisition section 24 (step ST52).

Further, the error is subtracted from the information on the Z-directional position of the culture container 50 detected by the first auto-focus displacement sensor 18*a*, the focus control amounts are acquired on the basis of the subtracted value (step ST54), and then, the auto-focus control is performed on the basis of the focus control amounts (step ST56).

Further, after the auto-focus control, at a time point when the observation region R reaches an observation position where the position detection of the culture container 50 is performed, imaging for a phase difference image is performed (step ST58). The phase difference image is output from the imaging element 16 to the display controller 23 for storage. As described above, while the imaging for the phase difference image at each observation position is being performed in step ST58, the detection of the Z-directional position of the culture container 50 is performed in parallel at a forward position in the scanning direction with reference to the observation position.

Figure 13:
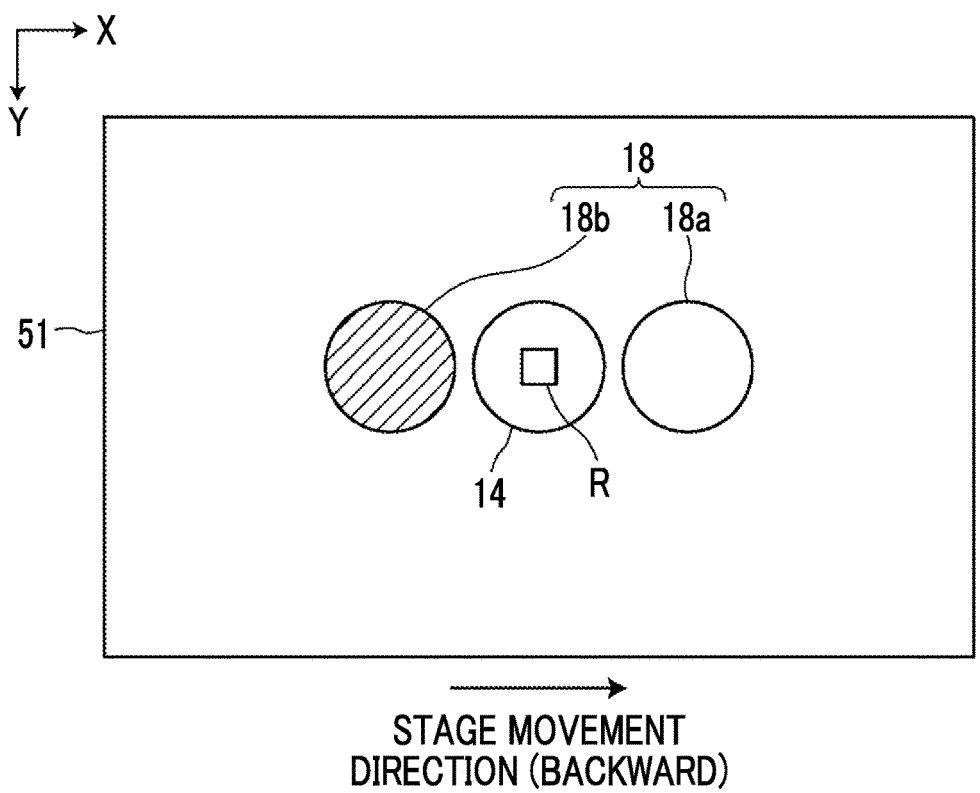
FIG. 13 is a schematic diagram illustrating another operation of the microscope observation system in a case where the stage is moving forward.

While the forward movement continues (NO in step ST60), the processes of steps ST44 to ST58 are repeatedly performed. Further, in a case where the forward movement is terminated, and then, the movement is switched to a returning movement as shown in FIG. 13 (YES in step ST60), a displacement sensor to be used is switched from the first auto-focus displacement sensor 18*a* to the second auto-focus displacement sensor 18*b* (step ST62). In addition, in a case where the entire scanning is not terminated at this time point (NO in step ST64), the stage 51 is reversely moved again, and then, the processes of steps ST44 to ST58 are performed.

The displacement sensor to be used is switched whenever the movement direction of the stage 51 is changed, and the processes of steps ST44 to ST62 are repeatedly performed until the entire scanning is terminated. Further, at a time point when the observation region R reaches the position of the scanning end point E shown in FIG. 7, the entire scanning is terminated (YES in step ST64).

After the entire scanning is terminated, the display controller 23 combines phase difference images in the respective observation regions R to generate a composite phase difference image (step ST66), and displays the generated composite phase difference image on the display device 30 (step ST68).

According to the microscope observation system of this embodiment, since an error between the vertical position of the stage 51, namely, the culture container 50 at the time point when the vertical position of the culture container 50 at each observation position is precedently detected by the first or second auto-focus displacement sensor 18*a* or 18*b* and the vertical position of the stage 51, namely, the culture container 50 at the time point when the observation region of the imaging optical system 14 is scanned up to each observation position is acquired, and at least one of the first operation to the fourth operation is performed on the basis of the acquired error and the vertical position of the culture container 50 detected by the first or second auto-focus displacement sensor 18*a* or 18*b*. Accordingly, it is possible to perform the auto-focus control with high accuracy without being affected by a vertical position change due to the movement of the culture container 50.

In addition, since the auto-focus control is performed by the first to seventh operation sections 15A to 15G, it is possible to perform the auto-focus control with high speed compared with a case where the auto-focus control is performed by only one operation.

In the microscope observation system of this embodiment, the Z-directional positions of the stage 51 are detected using the first and second auto-focus displacement sensors 18*a* and 18*b*, but the invention is not limited thereto, and position measurement displacement sensors that measure the Z-directional position of the stage 51, namely, the Z-directional position of the culture container 50, other than the first and second auto-focus displacement sensors 18*a* and 18*b*, may be provided.

Figure 14:
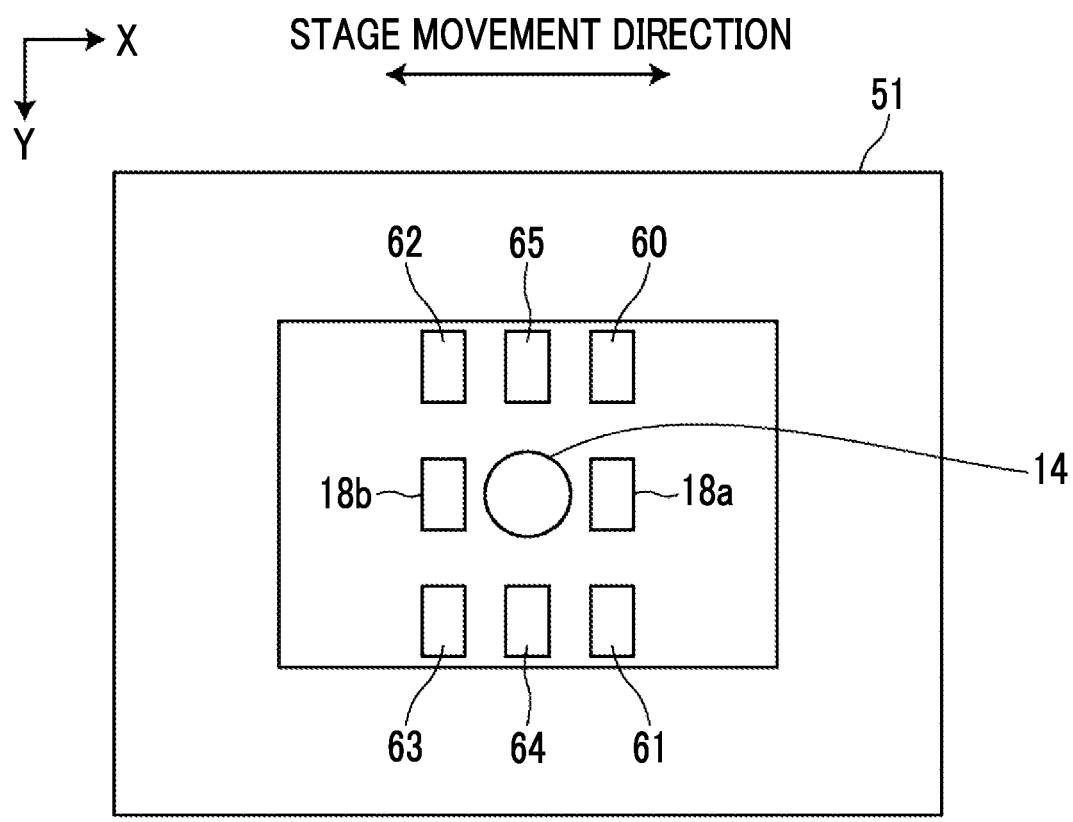
FIG. 14 is a schematic diagram showing an observation device according to another embodiment of the invention.

FIG. 14 is a schematic configuration diagram of another embodiment of the present invention provided with position measurement displacement sensors 60 to 65. The position measurement displacement sensors 60 to 63 correspond to first position measurement displacement sensors of the invention, and the position measurement displacement sensors 64 and 65 correspond to second stage position measurement displacement sensors of the invention. Specifically, the position measurement displacement sensors 60 and 61 are disposed at the same position as that of the first auto-focus displacement sensor 18*a* in the X direction, and are arranged in parallel in the Y direction with the first auto-focus displacement sensor being interposed therebetween. Further, the position measurement displacement sensors 62 and 63 are disposed at the same position as that of the second auto-focus displacement sensor 18*b* in the X direction, and are arranged in parallel in the Y direction with the second auto-focus displacement sensor 18*b* being interposed therebetween. In addition, the position measurement displacement sensors 64 and 65 are disposed at the same position as that of the imaging optical system 14 in the X direction, and are arranged in parallel in the Y direction with the imaging optical system 14 being interposed therebetween. It is preferable that the position measurement displacement sensors 60 to 65 are laser displacement sensors.

Further, in the above-described embodiment, the Z-directional position of the stage 51, namely, the Z-directional position of the culture container 50 at the scanning position in the observation region of the imaging optical system 14 is calculated on the basis of the Z-directional position of the stage 51 detected by the first auto-focus displacement sensor 18*a* and the Z-directional position of the stage 51 detected by the second auto-focus displacement sensor 18*b*. However, since the first and second auto-focus displacement sensors 18*a* and 18*b* and the imaging optical system 14 have different X-directional positions, the Z-directional position of the stage 51 at the scanning position in the observation region of the imaging optical system 14 is not constantly accurate.

On the other hand, in another embodiment shown in FIG. 14, the position measurement displacement sensors 64 and 65 are disposed at the same position as the imaging optical system 14 in the X direction. Accordingly, it is possible to calculate a Z-directional position change due to the movement of the stage 51 in the X direction with high accuracy compared with the above-described embodiment.

Here, the configuration of the above-described embodiment is preferable in terms of cost reduction.

In the other embodiment, instead of detecting the Z-directional position of the stage 51 by the first auto-focus displacement sensor 18a, the Z-directional position of the stage 51 at the position of the first auto-focus displacement sensor 18a is acquired using the position measurement displacement sensors 60 and 61. Specifically, by calculating an average value of a Z-directional position Z60 of the stage 51 detected by the position measurement displacement sensor 60 and a Z-directional position Z61 of the stage 51 detected by the position measurement displacement sensor 61, a Z-directional position Z70 of the stage 51 at the position of the first auto-focus displacement sensor 18a is calculated.

Further, instead of detecting the Z-directional position of the stage 51 by the second auto-focus displacement sensor 18b, the Z-directional position of the stage 51 at the position of the second auto-focus displacement sensor 18b is acquired using the position measurement displacement sensors 62 and 63. Specifically, by calculating an average value of a Z-directional position Z62 of the stage 51 detected by the position measurement displacement sensor 62 and a Z-directional position Z63 of the stage 51 detected by the position measurement displacement sensor 63, a Z-directional position Z80 of the stage 51 at the position of the second auto-focus displacement sensor 18b is calculated.

Further, in the other embodiment, the Z-directional position of the stage 51 at the scanning position in the observation region of the imaging optical system 14 is acquired using the position measurement displacement sensors 64 and 65. Specifically, by calculating an average value of a Z-directional position Z64 of the stage 51 detected by the position measurement displacement sensor 64 and a Z-directional position Z65 of the stage 51 detected by the position measurement displacement sensor 65, a Z-directional position Z90 of the stage 51 at the scanning position in the observation region of the imaging optical system 14 is calculated.

Further, in another embodiment, in the case of the forward movement, by subtracting the position Z90 from the Z-directional position Z70 of the stage 51, the above-described error of the Z-directional position of the stage 51, namely, the error of the Z-directional position of the culture container 50 is calculated. Further, in the case of the returning movement, by subtracting the position Z90 from the Z-directional position Z80 of the stage 51, the above-described error of the Z-directional position of the stage 51, namely, the error of the Z-directional position of the culture container 50 is calculated.

In the other embodiment, six position measurement displacement sensors 60 to 65 are provided, but all of them may not be provided. For example, only the position measurement displacement sensors 64 and 65 among the six displacement sensors may be provided. In this case, the Z-directional positions of the stage 51 at the positions of the first and second auto-focus displacement sensors 18a and 18b are detected using the first and second auto-focus displacement sensors 18a and 18b.

In the other embodiment, the error of the Z-directional position of the stage 51 is acquired as the error of the Z-directional position of the culture container 50 using the position measurement displacement sensors 60 to 65, but the Z-directional position of the culture container 50 may be directly measured by the position measurement displacement sensors 60 to 65 to acquire the error of the Z-directional position of the culture container 50.

In the above-described embodiments, the observation position in the culture container 50 is scanned by moving the stage 51, but the present invention is not limited to thereto, and an imaging system that includes the imaging optical system 14, the detection section 18, and the imaging element 16 may be configured to be moved. Further, both the stage 51 and the imaging system may be configured to be moved.

In the above-described embodiments, the operation section 15 performs the auto-focus control by the first to seventh operation sections 15A to 15G, but instead, only the first to fourth operation sections 15A to 15D, and the sixth to seventh operation sections 15F and 15G may be provided. Further, the auto-focus control may be performed using only one of the first to fourth operation sections 15A to 15D, and the sixth to seventh operation sections 15F and 15G. In this case, the auto-focus control may be further performed using the fifth operation section 15E. Further, only one of the first to fourth operation sections 15A to 15D, and the sixth to seventh operation sections 15F and 15G may be provided. In this case, similarly, the fifth operation section 15E may be further provided, and the auto-focus control may be configured to be performed using the fifth operation section 15E. In addition, the auto-focus control may be performed using a plurality of operation sections among the first to fourth operation sections 15A to 15D, and the sixth to seventh operation sections 15F and 15G. In this case, similarly, the auto-focus control may be performed further using the fifth operation section 15E.

Further, in the above-described embodiments, the focal length changing optical system 70 is disposed between the imaging optical system 14 and the imaging element 16, but may be disposed between the imaging optical system 14 and the stage 51.

In the above-described embodiments, the focal length of the imaging optical system 14 is changed by the first operation section 15A, the sixth operation section 15F, and the seventh operation section 15G, but the focal length of the imaging optical system 14 may be changed by only any one or two of the first operation section 15A, the sixth operation section 15F, and the seventh operation section 15G.

In the above-described embodiments, the culture container 50 is moved in the optical axis direction by moving the stage 51 in the optical axis direction using the fourth operation section 15D. However, instead of moving the stage 51 in the optical axis direction, a mechanism for moving the culture container 50 in the optical axis direction may be provided, and only the culture container 50 may be moved in the optical axis direction.

Figure 15:
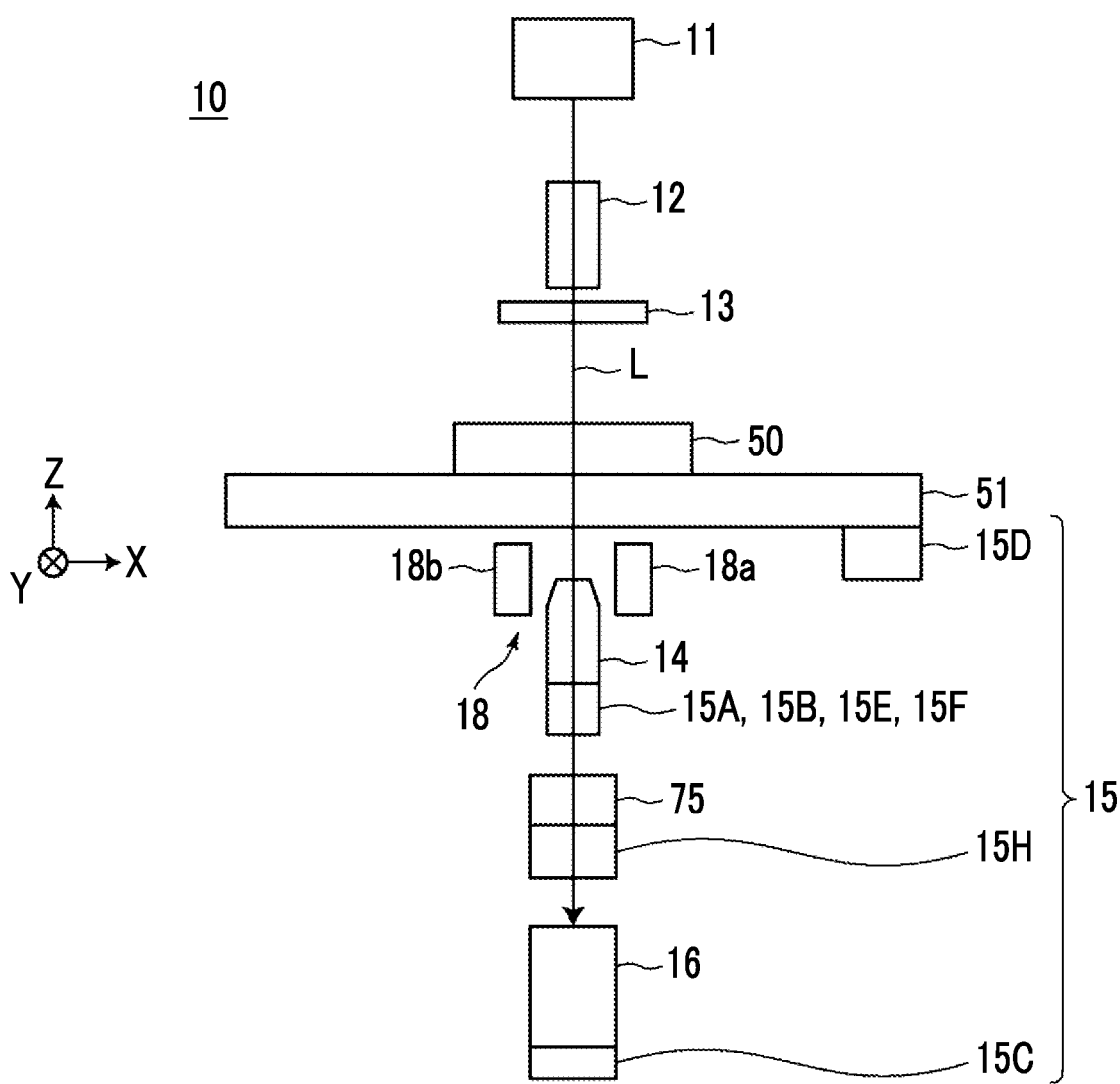
FIG. 15 is a diagram showing a schematic configuration of a microscope observation system that uses an observation device according to an embodiment of the present invention.

In the above-described embodiments, the optical system that moves the first and second wedge prisms 71 and 72 is used as the focal length changing optical system 70 for changing the focal length of the imaging optical system 14. However, an optical element capable of changing a focal length, such as a liquid lens, a liquid crystal lens, a shape deformable lens, or the like, may be used as the focal length changing optical system. For example, instead of the focal length changing optical system 70 for moving the first and second wedge prisms 71 and 72, as shown in FIG. 15, a focal length changing optical system 75 including an optical element capable of changing a focal length may be provided between the imaging optical system 14 and the imaging element 16. In this case, the focal length changing optical system 75 is configured such that an applied voltage is changed by an eighth operation section 15H to change the focal length. The focal length changing optical system 75 may be disposed between the imaging optical system 14 and the stage 51. The focal length changing optical system 75 may be disposed in addition to the focal length changing optical system 70.

Further, in the above-described embodiments, the present invention is applied to a phase difference microscope, but the invention is not limited to the phase difference microscope, and may be applied to a different microscope such as a differential interference microscope or a bright field microscope.

In addition, in the above-described embodiments, a configuration in which a phase difference image formed by the imaging optical system 14 is captured by the imaging element 16 is shown, but a configuration in which an imaging element is not provided and an observation optical system or the like is provided so that a user is able to directly observe a phase difference image of an observation target formed by the imaging optical system 14 may be used. In this case, the observation device may be provided with at least one operation section among the first operation section 15A, the second operation section 15B, the fourth operation section 15D, and the sixth to seventh operation sections 15F and 15G to perform the auto-focus control. In this case, the fifth operation section 15E may be further provided to perform the auto-focus control. Further, instead of the focal length changing optical system 70 and the seventh operation section 15G, the focal length changing optical system 75 and the eighth operation section 15H may be provided to perform the auto-focus control.

EXPLANATION OF REFERENCES

10: microscope device
11: white light source
12: condenser lens
13: slit plate
14: imaging optical system
14a: phase difference lens
14b: objective lens
14c: phase plate
14d: imaging lens
15: operation section
15A: first operation section
15B: second operation section
15C: third operation section
15D: fourth operation section
15E: fifth operation section
15F: sixth operation section
15G: seventh operation section
15H: eighth operation section
16: imaging element
17: horizontal driving section
18: detection section
18a: first auto-focus displacement sensor
18b: second auto-focus displacement sensor
20: microscope control device
21: imaging optical system controller
22: scanning controller
23: display controller
24: vertical direction error acquisition section
30: display device
40: input device
50: culture container
51: stage
51a: opening
60 to 65: position measurement displacement sensor
70, 75: focal length changing optical system
71: first wedge prism
72: second wedge prism
L: illumination light
R: observation region
W: well

What is claimed is:

1. An observation device comprising:
an imaging optical system having an imaging lens that forms an image of an observation target in a container in which the observation target is contained;
an imaging system having an imaging element that captures the image of the observation target formed by the imaging optical system;
an operation section that performs at least one of a first operation of changing a focal length of the imaging optical system, a second operation of moving the imaging lens in an optical axis direction, a third operation of moving the imaging element in the optical axis direction, or a fourth operation of moving the container in the optical axis direction;
a horizontal driving section that moves at least one of the container or the imaging optical system in a horizontal plane;
a scanning controller that controls the horizontal driving section to move at least one of the container or the imaging optical system in the horizontal plane, to scan each observation position in the container in an observation region of the imaging optical system;
a detection section having an auto-focus displacement sensor that precedently detects a vertical position of the container at the observation position before the observation region reaches the observation position in the container, through the scan in the observation region of the imaging optical system;
an operation controller that controls the operation section on the basis of the vertical position of the container detected by the detection section; and
a vertical direction error acquisition section that acquires an error between a vertical position of the container at a time point when the vertical position of the container is precedently detected at the observation position by the auto-focus displacement sensor and a vertical position of the container at a time point when the observation region of the imaging optical system is scanned up to the observation position,
wherein when the observation position is scanned by the observation region of the imaging optical system, the operation controller controls the operation section on the basis of the vertical position of the container at the observation position that is precedently detected by the auto-focus displacement sensor and the error acquired by the vertical direction error acquisition section.

2. The observation device according to claim 1, wherein the operation section performs a plurality of operations among the first operation, the second operation, the third operation, and the fourth operation.

3. The observation device according to claim 1, wherein the operation section includes a piezoelectric element, and the second operation and the third operation are performed by the piezoelectric element.

4. The observation device according to claim 1, wherein the imaging optical system further includes an objective lens that forms the image of the observation target in the container, and wherein the first operation includes at least one of an operation of changing a focal length of the imaging lens or an operation of changing a focal length of the objective lens.

5. The observation device according to claim 4, wherein the operation section performs a fifth operation of moving the objective lens in the optical axis direction.

6. The observation device according to claim 1, further comprising:
a focal length changing optical system that changes the focal length of the imaging optical system,
wherein the first operation includes at least one of an operation of changing the focal length of the imaging lens, an operation of changing the focal length of the objective lens, or an operation of changing the focal length of the imaging optical system by the focal length changing optical system.

7. The observation device according to claim 6, wherein the operation section performs a fifth operation of moving the objective lens in the optical axis direction.

8. The observation device according to claim 1, further comprising:
a focal length changing optical system that changes the focal length of the imaging optical system,
wherein the first operation includes an operation of changing the focal length of the imaging optical system by the focal length changing optical system.

9. The observation device according to claim 1, wherein the imaging optical system further includes an objective lens that forms the image of the observation target in the container, and
wherein the operation section performs a fifth operation of moving the objective lens in the optical axis direction.

10. The observation device according to claim 1, wherein the horizontal driving section moves the container in a sub-scanning direction orthogonal to a main scanning direction while reciprocating the container in the main scanning direction with respect to the imaging optical system, and
wherein the vertical direction error acquisition section acquires different errors between a case where the container is moved forward with respect to the imaging optical system and a case where the container is moved backward with respect to the imaging optical system.

11. The observation device according to claim 10, wherein the detection section includes at least two auto-focus displacement sensors that are provided in parallel in the main scanning direction with the imaging optical system being interposed therebetween, and
wherein the vertical direction error acquisition section acquires the vertical position of the container at the scanning position of the observation region of the imaging optical system, on the basis of the vertical position of the container detected by the two auto-focus displacement sensors.

12. The observation device according to claim 10, further comprising:
two first position measurement displacement sensors that are provided in parallel in the sub-scanning direction at the same positions as the positions of the auto-focus displacement sensors in the main scanning direction with the auto-focus displacement sensors being interposed therebetween,
wherein the vertical direction error acquisition section acquires the vertical position of the container at the positions of the auto-focus displacement sensors, on the basis of the vertical position of the container detected by the two first position measurement displacement sensors.

13. The observation device according to claim 10, further comprising:
two second position measurement displacement sensors that are provided in parallel in the sub-scanning direction at the same position as the position of the imaging optical system in the main scanning direction with the imaging optical system being interposed therebetween,
wherein the vertical direction error acquisition section acquires the vertical position of the container at a scanning position in the observation region of the imaging optical system, on the basis of the vertical position of the container detected by the two second position measurement displacement sensors.

14. The observation device according to claim 1, wherein the vertical direction error acquisition section has a table in which each observation position in the container is associated with the error at each observation position.

15. The observation device according to claim 14, wherein the table is updated at a preset time.

16. The observation device according to claim 1, wherein the auto-focus displacement sensor is a laser displacement sensor.

17. An observation device comprising:
an imaging optical system having an imaging lens that forms an image of an observation target in a container in which the observation target is contained;
an operation section that performs at least one of a first operation of changing a focal length of the imaging optical system, a second operation of moving the imaging lens in an optical axis direction, or a fourth operation of moving the container in the optical axis direction;
a horizontal driving section that moves at least one of the container or the imaging optical system in a horizontal plane;
a scanning controller that controls the horizontal driving section to move at least one of the container or the imaging optical system in the horizontal plane, to scan each observation position in the container in an observation region of the imaging optical system;
a detection section having an auto-focus displacement sensor that precedently detects a vertical position of the container at the observation position before the observation region reaches the observation position in the container, through the scan in the observation region of the imaging optical system;
an operation controller that controls the operation section on the basis of the vertical position of the container detected by the detection section; and
a vertical direction error acquisition section that acquires an error between a vertical position of the container at a time point when the vertical position of the container is precedently detected at the observation position by the auto-focus displacement sensor and a vertical position of the container at a time point when the observation region of the imaging optical system is scanned up to the observation position,
wherein when the observation position is scanned by the observation region of the imaging optical system, the operation controller controls the operation section on the basis of the vertical position of the container at the observation position that is precedently detected by the auto-focus displacement sensor and the error acquired by the vertical direction error acquisition section.

18. The observation device according to claim 17, wherein the operation section performs a plurality of operations among the first operation, the second operation, and the fourth operation.

19. The observation device according to claim 17, wherein the operation section includes a piezoelectric element, and the second operation is performed by the piezoelectric element.

20. The observation device according to claim 17, wherein the imaging optical system further includes an objective lens that forms the image of the observation target in the container, and
wherein the first operation includes at least one of an operation of changing a focal length of the imaging lens or an operation of changing a focal length of the objective lens.

21. The observation device according to claim 17, further comprising:
a focal length changing optical system that changes the focal length of the imaging optical system,
wherein the first operation includes at least one of an operation of changing the focal length of the imaging lens, an operation of changing the focal length of the objective lens, or an operation of changing the focal length of the imaging optical system by the focal length changing optical system.

22. The observation device according to claim 20, wherein the operation section performs a fifth operation of moving the objective lens in the optical axis direction.

23. The observation device according to claim 17, further comprising:
a focal length changing optical system that changes the focal length of the imaging optical system,
wherein the first operation includes an operation of changing the focal length of the imaging optical system by the focal length changing optical system.

24. The observation device according to claim 17, wherein the imaging optical system further includes an objective lens that forms the image of the observation target in the container, and
wherein the operation section performs a fifth operation of moving the objective lens in the optical axis direction.

25. The observation device according to claim 17, wherein the horizontal driving section moves the container in a sub-scanning direction orthogonal to a main scanning direction while reciprocating the container in the main scanning direction with respect to the imaging optical system, and
wherein the vertical direction error acquisition section acquires different errors between a case where the container is moved forward with respect to the imaging optical system and a case where the container is moved backward with respect to the imaging optical system.

26. The observation device according to claim 25, wherein the detection section includes at least two auto-focus displacement sensors that are provided in parallel in the main scanning direction with the imaging optical system being interposed therebetween, and
wherein the vertical direction error acquisition section acquires the vertical position of the container at the scanning position of the observation region of the imaging optical system, on the basis of the vertical position of the container detected by the two auto-focus displacement sensors.

27. The observation device according to claim 25, further comprising:
two first position measurement displacement sensors that are provided in parallel in the sub-scanning direction at the same positions as the positions of the auto-focus displacement sensors in the main scanning direction with the auto-focus displacement sensors being interposed therebetween,
wherein the vertical direction error acquisition section acquires the vertical position of the container at the positions of the auto-focus displacement sensors, on the basis of the vertical position of the container detected by the two first position measurement displacement sensors.

28. The observation device according to claim 25, further comprising:
two second position measurement displacement sensors that are provided in parallel in the sub-scanning direction at the same position as the position of the imaging optical system in the main scanning direction with the imaging optical system being interposed therebetween,
wherein the vertical direction error acquisition section acquires the vertical position of the container at a scanning position in the observation region of the imaging optical system, on the basis of the vertical position of the container detected by the two second position measurement displacement sensors.

29. The observation device according to claim 17, wherein the vertical direction error acquisition section has a table in which each observation position in the container is associated with the error at each observation position.

30. The observation device according to claim 29, wherein the table is updated at a preset time.

31. The observation device according to claim 17, wherein the auto-focus displacement sensor is a laser displacement sensor.

32. An observation method for moving at least one of a container in which an observation target is contained, or an imaging optical system having an imaging lens that forms an image of the observation target in the container in a horizontal plane, to scan each observation position in the container in an observation region of the imaging optical system and capture an image of the observation target imaged by the imaging optical system using an imaging element, comprising:
a step of precedently detecting a vertical position of the container at the observation position before the observation region reaches the observation position in the container, through the scan in the observation region of the imaging optical system;
a step of acquiring an error between a vertical position of the container at a time point when the vertical position of the container is precedently detected at the observation position and a vertical position of the container at a time point when the observation region of the imaging optical system is scanned up to the observation position; and
a step of performing at least one of a first operation of changing a focal length of the imaging optical system, a second operation of moving the imaging lens in an optical axis direction, a third operation of moving the imaging element in the optical axis direction, or a fourth operation of moving the container in the optical axis direction, when the observation position is scanned by the observation region of the imaging optical system, on the basis of the vertical position of the container at the observation position that is precedently detected and the error.

33. A non-transitory computer readable recording medium storing an observation device control program that causes a computer to execute an observation method for moving at least one of a container in which an observation target is contained, or an imaging optical system having an imaging lens that forms an image of the observation target in the container in a horizontal plane, to scan each observation position in the container in an observation region of the imaging optical system and capture an image of the observation target imaged by the imaging optical system using an imaging element, the program causing the computer to execute:

a step of precedently detecting a vertical position of the container at the observation position before the observation region reaches the observation position in the container, through the scan in the observation region of the imaging optical system;

a step of acquiring an error between a vertical position of the container at a time point when the vertical position of the container is precedently detected at the observation position and a vertical position of the container at a time point when the observation region of the imaging optical system is scanned up to the observation position; and a step of performing at least one of a first operation of changing a focal length of the imaging optical system, a second operation of moving the imaging lens in an optical axis direction, a third operation of moving the imaging element in the optical axis direction, or a fourth operation of moving the container in the optical axis direction, when the observation position is scanned by the observation region of the imaging optical system, on the basis of the vertical position of the container at the observation position that is precedently detected and the error.

\* \* \* \* \*